United States Patent
Davis et al.

(10) Patent No.: US 9,626,776 B2
(45) Date of Patent: Apr. 18, 2017

(54) APPARATUS, SYSTEMS, AND METHODS FOR PROCESSING A HEIGHT MAP

(71) Applicant: Cognex Corporation, Natick, MA (US)

(72) Inventors: Jason Davis, Franklin, MA (US); Michael C. Moed, Hopkinton, MA (US); Robert J. Tremblay, II, Grafton, MA (US)

(73) Assignee: COGNEX CORPORATION, Natick, MA (US)

( * ) Notice: Subject to any disclaimer, the term of this patent is extended or adjusted under 35 U.S.C. 154(b) by 8 days.

(21) Appl. No.: 14/136,864

(22) Filed: Dec. 20, 2013

(65) Prior Publication Data

US 2015/0178956 A1    Jun. 25, 2015

(51) Int. Cl.
| | | |
|---|---|---|
| G09G 5/00 | (2006.01) | |
| G06T 11/00 | (2006.01) | |
| G06T 7/00 | (2017.01) | |
| G06T 7/60 | (2017.01) | |

(52) U.S. Cl.
CPC .......... *G06T 11/003* (2013.01); *G06T 7/0042* (2013.01); *G06T 7/0065* (2013.01); *G06T 7/602* (2013.01); *G06T 11/001* (2013.01); *G06T 2207/10028* (2013.01); *G06T 2215/08* (2013.01)

(58) Field of Classification Search
CPC ..... G06T 15/04; G06T 11/001; G06T 15/005; G06T 1/60; G06T 11/003; G06T 2215/08; G06T 11/00; G09G 5/363
USPC ......................................................... 345/582
See application file for complete search history.

(56) References Cited

U.S. PATENT DOCUMENTS

| | | | | |
|---|---|---|---|---|
| 7,120,311 | B2 * | 10/2006 | Snyder | 382/276 |
| 2007/0195083 | A1 * | 8/2007 | Yoo et al. | 345/420 |
| 2012/0083982 | A1 * | 4/2012 | Bonefas et al. | 701/70 |

OTHER PUBLICATIONS

"Similar shape retrieval in MARS" (by Kaushik Chakrabarti, Michael Ortega-Binderberger, Kriengkrai Porkaew, and Sharad Mehrotra, in Proc. IEEE International Conference on Multimedia and Expo, 2000).*
No Author, "Gocator 2000 Family Version 1.0.1.21 User Manual," LMI Technologies, Inc., Canada, 145 pgs. (2010).

* cited by examiner

*Primary Examiner* — Ke Xiao
*Assistant Examiner* — Gordon Liu
(74) *Attorney, Agent, or Firm* — Wilmer Cutler Pickering Hale

(57) ABSTRACT

The disclosed apparatus, systems, and methods can process height maps. For example, the disclosed computerized method of determining posture information of an object in a two-dimensional height map captured by a range sensor system can include receiving the height map of the object captured by the range sensor system, generating a plurality of one-dimensional slices of the height map and a location record indicating locations of the plurality of one-dimensional slices on the height map, identifying points of interest in the plurality of one-dimensional slices, determining locations of the identified points of interest in the height map based on the location record, and determining the posture information of the object based on the locations of the identified points of interest in the height map.

24 Claims, 15 Drawing Sheets

APPARATUS, SYSTEMS, AND METHODS FOR PROCESSING A HEIGHT MAP

TECHNICAL FIELD

Disclosed apparatus, computerized systems, and computerized methods relate to processing a height map, and in particular to processing a height map from a range sensor system.

BACKGROUND

Determining a depth or a height of an object, also known as range sensing, is important in a variety of applications. For example, range sensing can be important in inspecting electronic assemblies, inspecting semiconductor packages during manufacturing, and digitizing three-dimensional ("3D") clay models.

Range sensing can be performed using a range sensor system, which can provide a height map (also known as a range image or a depth image) as an output. The height map can be processed using a computing device to determine the location of an object, the shape of an object, and/or the 3D profile of an object captured by the height map. Unfortunately, height map processing can involve a large amount of computation because height map processing often includes a 3D registration of a height map. Therefore, there is a general need to reduce a computational complexity of height map processing.

SUMMARY

In accordance with the disclosed subject matter, apparatus, systems, non-transitory computer-readable media, and methods are provided for processing a height map from a range sensor system.

Some embodiments include a computerized method of determining posture information of an object in a two-dimensional height map captured by a range sensor system. The method includes receiving, at a slice generation module in a computing device, the height map of the object captured by the range sensor system; generating, by the slice generation module, a plurality of one-dimensional slices of the height map and a location record indicating locations of the plurality of one-dimensional slices on the height map; identifying, by a posture information generation module in the computing device, a location of at least one point of interest in the height map based on the plurality of one-dimensional slices and the location record; and determining, by the posture information generation module, the posture information of the object based on the location of the at least one point of interest in the height map.

In some embodiments, the method also includes maintaining shape information of the object, and wherein determining the posture information of the object based on the locations further comprises determining the posture information of the object based on the locations of the identified discontinuities in the height map and the shape information.

In some embodiments, the shape information comprises one or more of: (1) a number of edges in the object, (2) a relative location of the edges with respect to other edges in the object, and (3) an angle between the edges in the object.

In some embodiments, generating the plurality of one-dimensional slices of the height map comprises generating two or more non-parallel one-dimensional slices, wherein each of the non-parallel one-dimensional slices is configured to cross a unique edge of the object, and wherein the posture information of the object comprises a location of the object.

In some embodiments, generating the plurality of one-dimensional slices of the height map comprises generating two or more one-dimensional slices configured to cross a first edge of the object, and wherein the posture information of the object comprises a rotation angle of the object around an axis aligned with a height of the object.

In some embodiments, determining the posture information of the object comprises fitting a line through the discontinuities along the first edge of the object and determining an angle between the line and a presumed orientation of the first edge of the object based on shape information of the object.

In some embodiments, the at least one point of interest comprises a discontinuity in one of the plurality of one-dimensional slices, and wherein identifying the location of the at least one point of interest in the height map based on the plurality of one-dimensional slices and the location record comprises identifying, by the posture information generation module in the computing device, the discontinuity in the one of the plurality of one-dimensional slices; and determining, by the posture information generation module, a location of the identified discontinuity in the height map based on the location record.

In some embodiments, the discontinuities in the plurality of one-dimensional slices comprise locations at which the plurality of one-dimensional slices crosses an edge of the object in the height map.

In some embodiments, identifying the location of the at least one point of interest based on the plurality of one-dimensional slices comprises determining a location at which one of the plurality of one-dimensional slices is aligned with a one-dimensional template.

In some embodiments, determining the location at which one of the plurality of one-dimensional slices is aligned with the one-dimensional template comprises determining a correlation between the one of the plurality of one-dimensional slices and the one-dimensional template.

In some embodiments, generating the plurality of one-dimensional slices of the height map comprises providing a grid comprising a plurality of slots over pixels of the height map; determining a first set of pixels of the height map that underlies one of the plurality of slots of the grid; and determining a value for the one of the plurality of slots of the grid by performing a consolidation operation on the first set of pixels, wherein the consolidation operation comprises one or more of: an averaging operation, a weighted average operation of non-missing values in the first set of pixels, a median operation, a maximum operation for finding a maximum value of the first set of pixels, a minimum operation for finding a minimum value of the first set of pixels, a regression operation, or any combination thereof.

In some embodiments, the method also includes determining a visibility slice associated with a portion of the grid, wherein the visibility slice indicates a visibility of pixels that underlies the portion of the grid, wherein determining the visibility slice comprises determining a visibility value for the one of the plurality of slots of the portion of the grid by a determining a proportion of missing values amongst the first set of pixels.

Some embodiments include a computing device configured to determine posture information of an object in a two-dimensional height map captured by a range sensor system. The computing device includes one or more interfaces configured to communicate with the range sensor system; and a processor, in communication with the one or more interfaces, and configured to run a slice generation module stored in memory. The slice generation module is configured to receive the height map of the object captured by the range sensor system; generate a plurality of one-dimensional slices of the height map and a location record indicating locations of the plurality of one-dimensional slices on the height map; and wherein the processor is further configured to run a posture information generation module stored in the memory that is configured to identify a location of at least one point of interest in the height map based on the plurality of one-dimensional slices and the location record; and determine the posture information of the object based on the location of the at least one point of interest in the height map.

In some embodiments, the posture information generation module is further configured to maintain shape information of the object and determine the posture information of the object based on the location of the at least one point of interest in the height map and the shape information.

In some embodiments, the slice generation module is further configured to generate two or more non-parallel one-dimensional slices, wherein each of the non-parallel one-dimensional slices is configured to cross a unique edge of the object, and wherein the posture information of the object comprises a location of the object.

In some embodiments, the slice generation module is further configured to generate two or more one-dimensional slices configured to cross a first edge of the object, and wherein the posture information of the object comprises a rotation angle of the object around an axis aligned with a height of the object.

In some embodiments, the slice generation module is further configured to: provide a grid comprising a plurality of slots over pixels of the height map; determine a first set of pixels of the height map that underlies one of the plurality of slots of the grid; and determine a value for the one of the plurality of slots of the grid by performing a consolidation operation on the first set of pixels, wherein the consolidation operation comprises one or more of: an averaging operation, a weighted average operation of non-missing values in the first set of pixels, a median operation, a maximum operation for finding a maximum value of the first set of pixels, a minimum operation for finding a minimum value of the first set of pixels, a regression operation, or any combination thereof.

Some embodiments include a non-transitory computer readable medium having executable instructions associated with a slice generation module and a posture information generation module. The instructions are operable to cause a data processing apparatus to: receive a height map of the object captured by a range sensor system in communication with a range sensor system; generate a plurality of one-dimensional slices of the height map and a location record indicating locations of the plurality of one-dimensional slices on the height map; identify a location of at least one point of interest in the height map based on the plurality of one-dimensional slices and the location record; and determine the posture information of the object based on the location of the at least one point of interest in the height map.

In some embodiments, the computer readable medium also includes executable instructions associated with the posture information generation, operable to cause the data processing apparatus to maintain shape information of the object and determine the posture information of the object based on the location of the at least one point of interest in the height map and the shape information.

In some embodiments, the computer readable medium also includes executable instructions operable to cause the data processing apparatus to: provide a grid comprising a plurality of slots over pixels of the height map; determine a first set of pixels of the height map that underlies one of the plurality of slots of the grid; and determine a value for the one of the plurality of slots of the grid by performing a consolidation operation on the first set of pixels, wherein the consolidation operation comprises one or more of: an averaging operation, a weighted average operation of non-missing values in the first set of pixels, a median operation, a maximum operation for finding a maximum value of the first set of pixels, a minimum operation for finding a minimum value of the first set of pixels, a regression operation, or any combination thereof.

Some embodiments include a computerized method of processing a two-dimensional height map captured by a range sensor system. The method includes receiving, at a slice generation module in a computing device, a two dimensional height map of an object captured by a range sensor system; generating, by the slice generation module, a one-dimensional slice of the height map, wherein the one-dimensional slice comprises a grid having a plurality of slots, wherein each of the plurality of slots comprises a value determined based on one or more pixels of the height map; and providing, by the slice generation module, a visibility slice that indicates a visibility value for each of the plurality of slots of the grid, wherein the visibility value indicates a confidence in a value in the corresponding slot in the 1D slice.

In some embodiments, the method also includes determining the visibility value for the one of the plurality of slots of the grid by determining a proportion of missing pixel values amongst the one or more pixels of the height map that were used to calculate the value of the one of the plurality of slots.

In some embodiments, the method also includes determining the visibility value for the one of the plurality of slots of the grid by determining a number of missing pixel values amongst the one or more pixels of the height map that were used to calculate the value of the one of the plurality of slots.

In some embodiments, the method also includes storing a threshold value in memory; binarizing the visibility slice using the threshold value, comprising, for each visibility value in the visibility slice: determining whether the visibility value is below the threshold; if the visibility value is below the threshold, setting the visibility value to a first value indicative of the corresponding slot in the 1D slice being not visible; and if the visibility value is not below the threshold, setting the visibility value to a second value indicative of the corresponding slot in the 1D slice being visible.

In some embodiments, the method also includes determining, by a posture information generation module, posture information of the object based on the one-dimensional slice and the visibility slice.

In some embodiments, the method also includes discarding, by the posture information generation module, the one-dimensional slice when any of visibility values in the visibility slice is less than a predetermined threshold.

In some embodiments, the method also includes determining, by the posture information generation module, a line to the one-dimensional slice by weighting the one-dimensional slice using the visibility slice.

Some embodiments include a computing device configured to process a height map captured by a range sensor system. The computing device includes one or more interfaces configured to communicate with the range sensor system; and a processor in communication with the one or more interfaces configured to run a computer program stored in memory. The computer program is configured to receive the height map of the object captured by the range sensor system; generate a one-dimensional slice of the height map, wherein the one-dimensional slice comprises a grid having a plurality of slots, wherein each of the plurality of slots comprises a value determined based on one or more pixels of the height map; and provide a visibility slice that indicates a visibility value for each of the plurality of slots of the grid, wherein the visibility value indicates a confidence in a value in the corresponding slot in the one-dimensional slice.

In some embodiments, the computer program is configured to determine the visibility value for the one of the plurality of slots of the grid by determining a proportion of missing pixel values amongst the one or more pixels of the height map that were used to calculate the value of the one of the plurality of slots.

In some embodiments, the computer program is configured to determine the visibility value for the one of the plurality of slots of the grid by determining a number of missing pixel values amongst the one or more pixels of the height map that were used to calculate the value of the one of the plurality of slots.

In some embodiments, the computer program is configured to determine posture information of the object based on the one-dimensional slice and the visibility slice.

In some embodiments, the computer program is configured to: store a threshold value in memory; binarize the visibility slice using the threshold value, comprising, for each visibility value in the visibility slice: determining whether the visibility value is below the threshold; if the visibility value is below the threshold, setting the visibility value to a first value indicative of the corresponding slot in the 1D slice being not visible; and if the visibility value is not below the threshold, setting the visibility value to a second value indicative of the corresponding slot in the 1D slice being visible.

In some embodiments, the computer program is configured to discard the one-dimensional slice when any of visibility values in the visibility slice is less than a predetermined threshold.

In some embodiments, the computer program is configured to determine a line to the one-dimensional slice by weighting the one-dimensional slice using the visibility slice.

Some embodiments include a non-transitory computer readable medium having executable instructions. The executable instructions are operable to cause a data processing apparatus to receive the height map of the object captured by the range sensor system; generate a one-dimensional slice of the height map, wherein the one-dimensional slice comprises a grid having a plurality of slots, wherein each of the plurality of slots comprises a value determined based on one or more pixels of the height map; and provide a visibility slice that indicates a visibility value for each of the plurality of slots of the grid, wherein the visibility value indicates a confidence in a value in the corresponding slot in the one-dimensional slice.

In some embodiments, the executable instructions are operable to cause the data processing apparatus to determine the visibility value for the one of the plurality of slots of the grid by determining a proportion of missing pixel values amongst the one or more pixels of the height map that were used to calculate the value of the one of the plurality of slots.

In some embodiments, the executable instruction are operable to cause the data processing apparatus to determine the visibility value for the one of the plurality of slots of the grid by determining a number of missing pixel values amongst the one or more pixels of the height map that were used to calculate the value of the one of the plurality of slots.

In some embodiments, the executable instruction are operable to cause the data processing apparatus to determine posture information of the object based on the one-dimensional slice and the visibility slice.

In some embodiments, the executable instruction are operable to cause the data processing apparatus to discard the one-dimensional slice when any of visibility values in the visibility slice is less than a predetermined threshold.

In some embodiments, the executable instruction are operable to cause the data processing apparatus to determine a line to the one-dimensional slice by weighting the one-dimensional slice using the visibility slice.

The disclosed apparatus, systems, methods, and the non-transitory computer readable medium described herein can provide an efficient mechanism for processing a height map to locate an object from a height map and to provide information on a posture of the object. Because the disclosed apparatus, systems, and methods use simple one-dimensional slices of a height map, the disclosed apparatus, systems, and methods are significantly more efficient compared to existing mechanisms that process the height map using 3D registration techniques.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are exemplary, and that it is contemplated that there are other systems and methods that are within the scope of the disclosed subject matter.

Range sensing is important in a variety of applications that can benefit from understanding a 3D profile of an object or a scene. Range sensing can be particularly useful in industrial applications such as, for example, in monitoring the quality of manufactured objects and discarding objects with defects.

Figure 1:
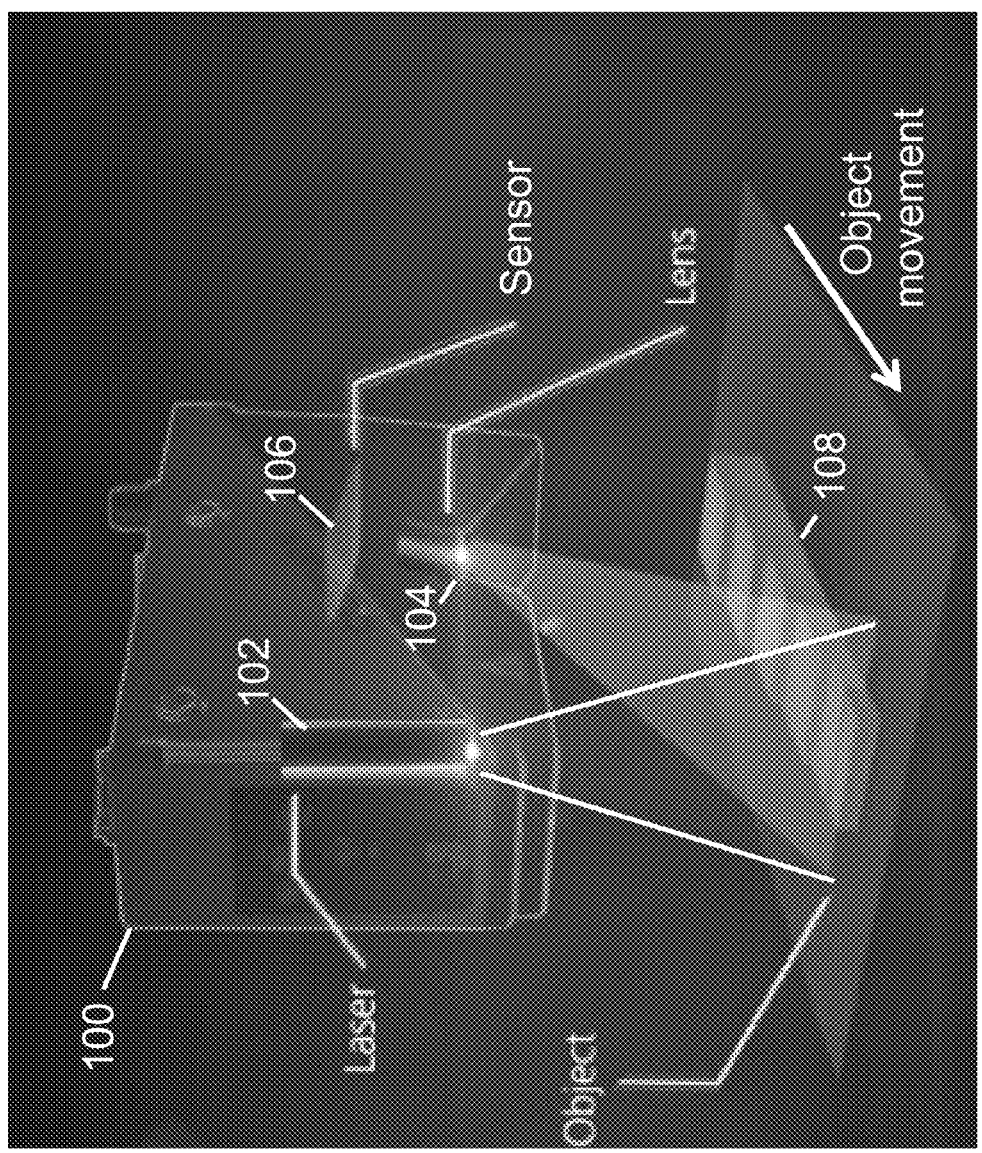
FIG. 1 illustrates an exemplary range sensor system having a laser scanner system in accordance with some embodiments.

Range sensing can be performed using a range sensor system. FIG. 1 illustrates an exemplary range sensor system with a laser scanner system in accordance with some embodiments. The laser scanner system 100 includes a laser 102 for providing laser light to an object 108, a lens 104 for collecting laser light reflected from the object 108, and a sensor 106 for capturing the laser light collected by the lens 104. The sensor 106 can be disposed at an angle with respect to the object 108 in order to capture a one-dimensional cross-sectional image (e.g., cross-sectional height) of the object 108 using the light projected from the laser 102, which is substantially orthogonal to the platform holding the object 108. The laser scanner system 100 can determine the one-dimensional cross-sectional image of the object by analyzing the deformation of the laser light captured by the sensor 106.

In some cases, the laser scanner system 100 scans the object 108 in one dimension. For example, the laser scanner system 100 provides a one-dimensional laser scan line via the laser 102 to the object 108 and determines the cross-sectional height of the object along that one-dimension.

In some cases, the laser scanner system 100 and the object 108 can move with respect to one another to determine a two-dimensional height map of the object. For example, the laser scanner system 100 can be located at a fixed position and the object 108 can be moved with respect to the laser scanner system 100 (for instance, the object 108 is placed on a moving conveyor belt) so that the laser scanner system 100 can scan the object 108 along the movement direction. In another example, the object 108 can be located at a fixed position and the laser scanner system 100 can be moved with respect to the object 108 so that the laser scanner system 100 can scan the object 108 along the movement direction.

In some cases, the laser scanner system 100 can include an encoder that triggers the laser 102 and the sensor 106 to take a one-dimensional cross-sectional image of the object 108 when the object 108 has moved a predetermined amount of distance with respect to the laser scanner system 100. Since the laser scanner system 100 takes a one-dimensional (1D) cross section of the object 108 at a time, the laser scanner system 100 can assemble the measured 1D cross sections to create a two-dimensional height map. For example, the laser scanner system 100 can create a two-dimensional height map by stacking the measured 1D cross sections in the order in which the 1D cross sections were measured.

In some cases, the range sensor system can include, instead of the laser scanner system 100, a stereo vision system with a plurality of cameras, a time-of-flight sensor system (e.g., a range imaging camera system that resolves a distance based on the known speed of a wave signal, measuring the time-of-flight of the wave signal between the camera and the subject for each point of the image), or a modulated light system (e.g., a range imaging system that shines a continually changing light at the subject, detects the reflected light, and determines the distance the light traveled by determining an amount of phase shift in the reflected light.)

Figure 2:
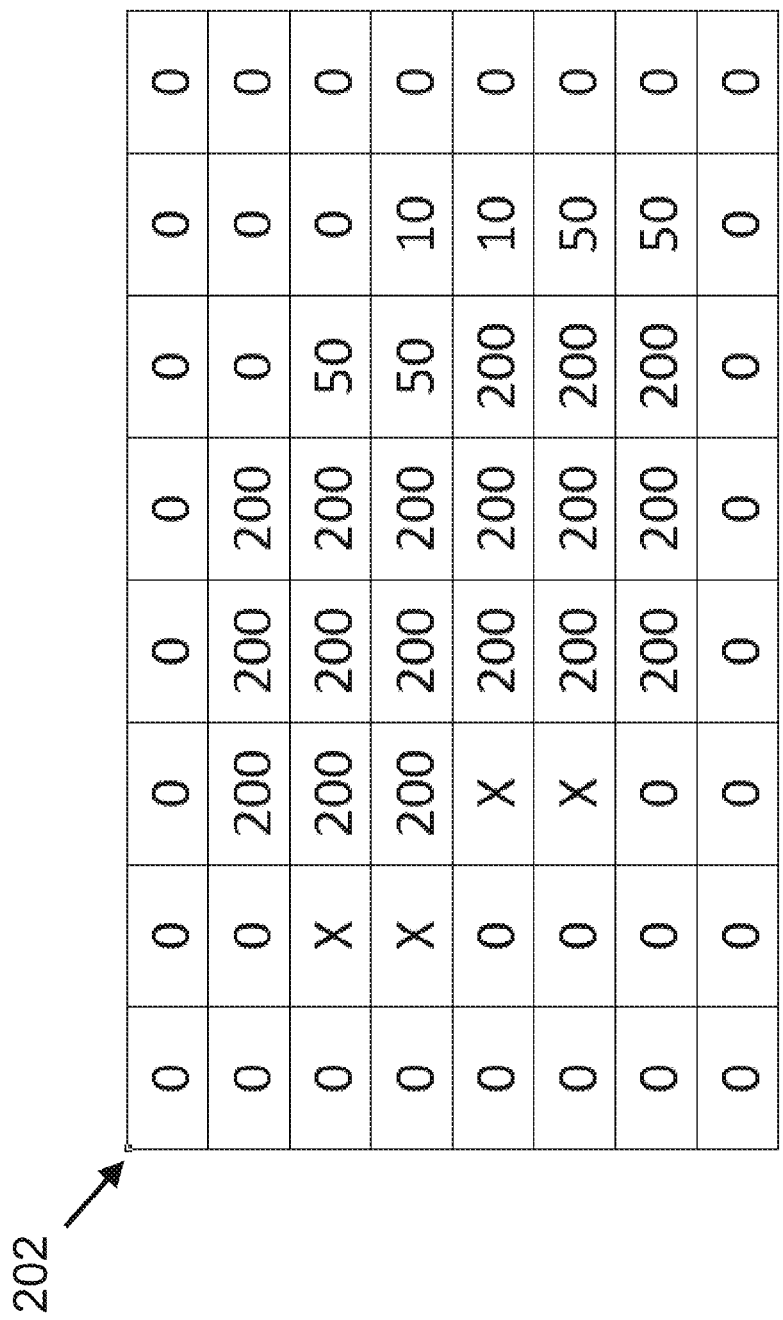
FIG. 2 illustrates a height map of an object measured by a range sensor system in accordance with some embodiments.

FIG. 2 illustrates a two-dimensional height map (also referred to as a height map) 202 of an object (e.g., object 108 of FIG. 1) measured by a range sensor system (e.g., the range sensor system of FIG. 1) according to some embodiments. The height map 202 can be defined on a pixel grid or any other coordinate systems. The aspect ratio of a pixel (e.g., a ratio between a pixel length along the x-axis and a pixel height along the y-axis) can be equal to one, greater than one, or smaller than one. In some embodiments, the aspect ratio of a pixel may be different for pixels in the same height map 202. In some embodiments, each pixel can indicate a height (or depth) of an object as measured by the range sensor system. For example, a pixel value of 200 can indicate a height that is greater than a pixel value of 50; a pixel value of 50 can indicate a height that is greater than a pixel value of 10; and a pixel value of 10 can indicate a height that is greater than a pixel value of 0 (e.g., where a value of 0 represents the platform holding the object). In another example, the polarity of the scale for representing the height can be changed. For instance, a pixel value of 200 can indicate a height that is lower than a pixel value of 50; a pixel value of 50 can indicate a height that is lower than a pixel value of 10; and a pixel value of 10 can indicate a height that is lower than a pixel value of 0. In some embodiments, the height map 202 can be substantially larger than the version illustrated in FIG. 2. For example, the height map can include 1024×1024 pixels, or more (e.g., 2048×8192 pixels).

In some cases, the range sensor system may fail to recover the height of the object at certain positions. For example, referring to FIG. 1, the laser light reflected from the object 108 can be occluded from the viewpoint of the sensor 106 due to the physical geometry of the laser scanner system 100 with respect to the object 108 (e.g., due to an indentation on the object 108). As another example, when a portion of the object 108 has a hole or is shiny, the range sensor system may not recover height information at that position of the object 108. As another example, the range sensor system may not recover height information in certain parts of the object due to laser speckles, which can be generated due to microstructure surface changes on the object.

When the range sensor system fails to recover the height of the object, the range sensor system can indicate such missing heights or missing height values differently from other pixels that represent the height values. For example, the range sensor system can indicate such missing heights or missing height values as the X's shown on the height map 202. As another example, the range sensor system can represent such missing heights or missing height values as a separate mask image. The mask image can indicate which pixels indicate valid height values (e.g., pixels with a value "1") and which pixels are missing height values (e.g., pixels with a value "0"). As another example, the range sensor system can represent such missing heights or missing height values as an extra bit added to each pixel of the height map. Each pixel in the height map can include an extra bit indicating whether the associated pixel is missing a height value. Yet, in other examples, the range sensor system can represent such missing heights or missing height values by designating a particular value as indicative of a missing height value. For example, when a value of a pixel in the height map is 0, then that can be indicative of the fact that the height value is missing for that pixel of the height map.

The height map 202 can be processed using a computing device to determine posture information about the object 108. For example, the computing device can process the height map to determine a posture of the object, including a location, an orientation, and a tilt of the object. The posture information of the object 108 can be useful in a variety of applications. For example, the posture information of the object 108 can be important in monitoring electronic assemblies, inspecting semiconductor packages, or digitizing 3D clay models.

Because the relative movement of the object 108 with respect to the range sensing system can be fast, the computing device should use an efficient mechanism for determining the posture information of the object 108. Unfortunately, existing mechanisms for determining the posture information of an object can be complex and time consuming. For example, most mechanisms determine the posture information of an object by performing a 3D registration of the height map, which is known to be complex and computation-intensive. Therefore, a range scanner system can be configured to provide an efficient mechanism for determining posture information of an object, as described more fully herein.

The disclosed apparatus, systems, and methods provide an efficient mechanism for determining posture information of an object. The disclosed apparatus, systems, and methods can provide posture information of an object by processing 1D slices of a height map associated with the object. A 1D slice is an array of pixel values from the underlying height map, such as a one-dimensional arrays of pixel values. As provided herein, a 1D slice of a height map can be generated by providing a line segment, having a plurality of slots, over the height map, and computing an appropriate height map value for each of the plurality of slots in the line segment, based on the height map pixel values that are contained within the corresponding slot. Using a 1D slice is advantageous because the 1D slice allows for a simple, efficient mechanism for determining the posture information of an object. The disclosed apparatus and systems can also include a computing device coupled to the range sensor system 100, where the computing device is configured to receive the height map from the range sensor system 100.

In some embodiments, the computing device can be configured to determine the posture information of an object by extracting two or more 1D slices of the height map. In some embodiments, one or more 1D slices can be non-parallel to one or more other 1D slices. For example, a first 1D slice of the extracted 1D slices can be orthogonal to a second 1D slice of the extracted 1D slices. The computing device can use the 1D slices of the height map to determine the location of the object (e.g., a translation vector [x, y]) and the height of the object (e.g., a height vector z) based on (1) the location of 1D slices in the height map, (2) an angle between the 1D slices, or any combination thereof. In some embodiments, the computing device can also be configured to extract 1D slices across a single edge of an object. For example, an object can include a plurality of edges or sides when viewed from the top. The computing device can extract two or more 1D slides from the single one of the plurality of edges or sides to determine a rotation of the object with respect to the height vector z and, a tilt of the object, and/or the like.

Figure 3:
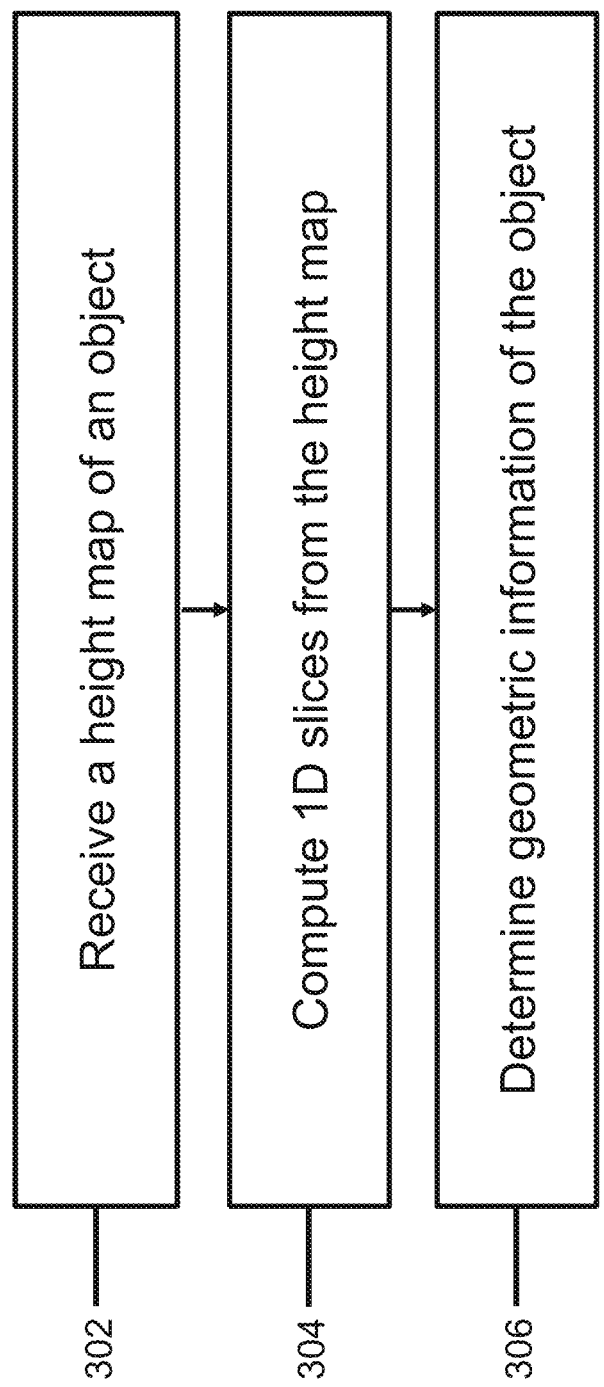
FIG. 3 illustrates a computerized method of determining posture information of an object from a height map in accordance with some embodiments.

FIG. 3 illustrates a computerized method of determining posture information of an object from a height map in accordance with some embodiments. In step 302, a computing device can receive a height map of an object from a range sensor system. In step 304, the computing device can use a slice generation module to create two or more 1D slices of the height map. In step 306, the computing device can use a posture information generation (PIG) module to determine posture information of the object.

Referring to step 304, the 1D slices of the height map can include a plurality of pixel values across a line segment of the height map. The plurality of pixel values across a line segment can be calculated by extracting values from the height map, which may include interpolating or processing pixel values in a neighborhood of a line segment to determine the pixel values for the line segment. As described with respect to FIG. 4, the line segment can include a plurality of slots arranged along one dimension. The resolution of a 1D slice can be controlled by controlling the size of the slots in the line segment. In some cases, one slot in the line segment can cover a plurality of pixels in the height map. In such cases, the slice generation module can perform a consolidation operation on the pixels covered by the slot to generate a single value for the slot (e.g., such as averaging the covered pixels).

In some cases, a line segment can include a "missing height" or a "missing height value" (e.g., "X" in the height map 202 of FIG. 2). To differentiate between a first value of a 1D slice originating from a missing height value and a second value of the 1D slice originating from a properly captured height value, the slice generation module can generate a visibility slice that indicates, for each slot of the 1D slice, a visibility of the values from which the 1D slice was created. The visibility slice is described in further detail below in reference to FIG. 5. In some embodiments, the visibility value of a particular pixel can indicate a proportion of missing height values amongst the pixels that underlie the slot in the 1D slice (e.g., the ratio between the number of missing height values and the number of pixels that underlie the slot). In other embodiments, the visibility value of a particular pixel can indicate a number of missing height values amongst the pixels that underlie the slot in the 1D slice.

Referring to step 306, a posture information generation (PIG) module in a computing device can determine the posture information of the object based on 1D slices created in step 304. In some embodiments, when the PIG module receives a set of 1D slices (two or more of which may be non-parallel) from the range sensor system 100, the PIG module can compute the location (e.g., a translation vector [x, y]) of the object, the height (e.g., a height vector z) of the object, and/or the like. For example, the PIG module can be configured to identify the location of points of interest in the height map based on the 1D slices, and use the identified location of points of interest to determine the location, the height, and any relevant posture information of the object. In some embodiments, when the PIG module receives two or more 1D slices along a single edge of an object, the PIG module can compute a rotation of the object with respect to the height vector z and, optionally, a tilt of the object. The PIG module can, for example, identify a line that models the locations of the discontinuities associated with the 1D slices, determine an angle between the identified line and an edge of the object in a base posture (e.g., a posture in which the object is presumed to be in), and/or the like.

In some embodiments, the PIG module can use shape information of the object to determine the posture information of the object (e.g., based on the 1D slices from the height map). The shape information can include (1) a number of edges in the object, (2) a relative position of edges with respect to other edges in the object, and/or (3) an angle between edges in the object, or any other shape information. In some cases, the shape information can also include a base posture of the object. For example, the shape information can indicate that the known configuration of the object if it is in an base posture position.

In some embodiments, the shape information can be provided (e.g., pre-configured) to the PIG module in advance of computing the posture information. For example, the PIG module can maintain the shape information in memory of the computing device. The PIG module can use the shape information in conjunction with the 1D slices to determine the posture information of the object.

In some embodiments, the slice generation module can generate a 1D slice of a height map in an arbitrary orientation (e.g., compared to the orientation of the height map). The slice generation module may perform an operation that is mathematically similar to rotating a height map and extracting a row (or, more precisely, to extract multiple rows and averaging them together). However, the slice generation module, as disclosed herein, can be much more efficient because the slice generation module does not need to perform unnecessary computations, such as a rotation of some regions in the height map that do not contribute to the desired 1D slice. Furthermore, the slice generation module, as disclosed herein, can be capable of generating a visibility slice that provides a confidence value for each of the pixels in the 1D slice.

Figure 4:
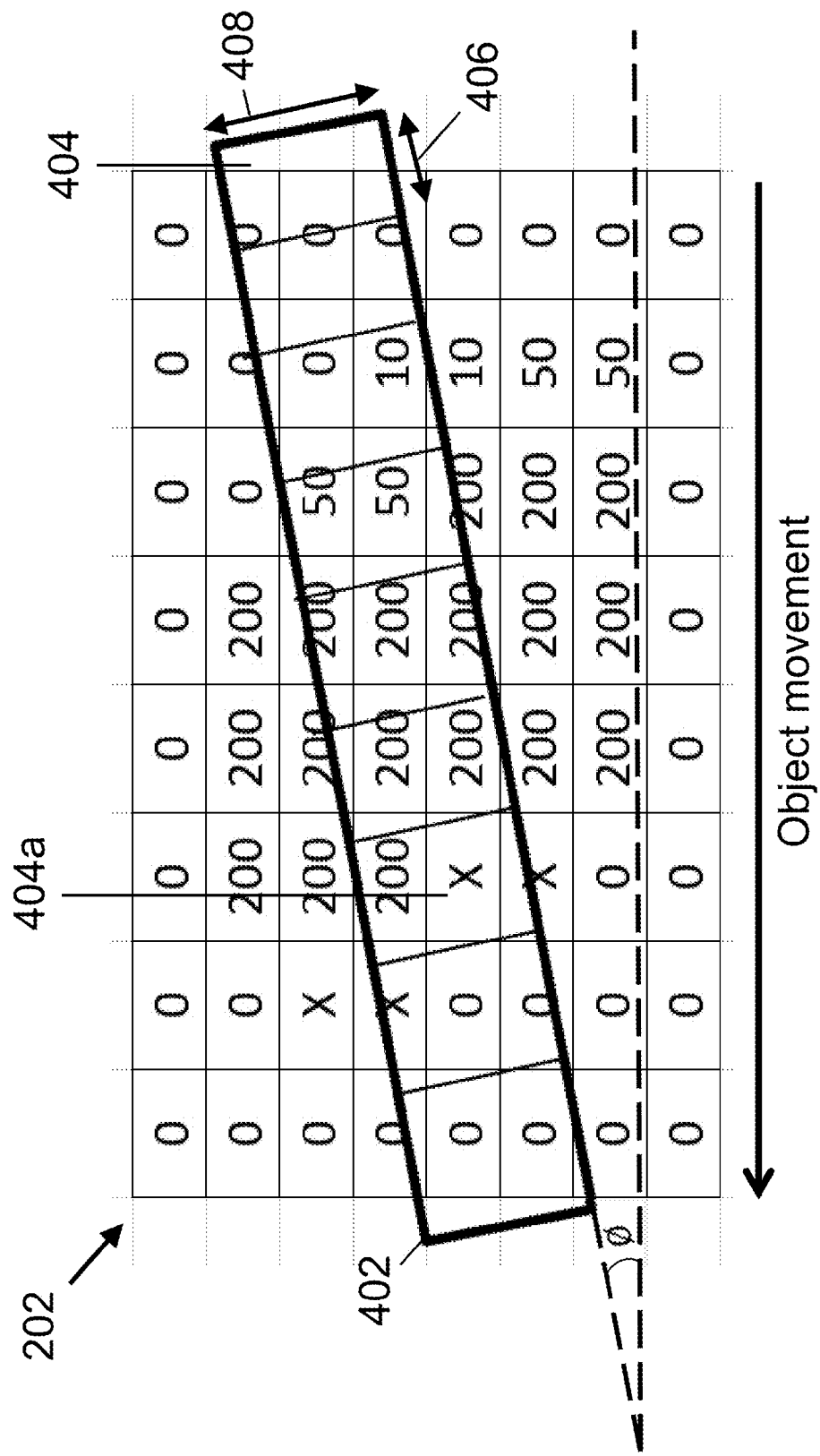
FIG. 4 illustrates a process for generating a 1D slice of a height map in accordance with some embodiments.

FIG. 4 illustrates a process for generating a 1D slice of a height map using a slice generation module in accordance with some embodiments. The slice generation module can be configured to generate a 1D slice of the height map 202 in arbitrary orientations at arbitrary spatial locations in the height map. For example, the slice generation module can be configured to compute a 1D slice along a direction defined by an angle (I) with respect to the direction of the object movement.

In some embodiments, the slice generation module can generate a 1D slice of a height map 202 by providing a line segment having a grid 402 over the height map 202. The grid 402 can include a plurality of slots 404, each slot for holding a height value of the 1D slice. When a slot 404 in the grid 402 covers more than one pixel of the height map 202, the slice generation module can perform a consolidation operation over the pixels covered by the slot 402 to determine a value for the slot 404. The consolidation operation over the covered pixels can include an averaging operation of the pixels, a weighted average operation of non-missing pixels based on an area covered by the slot 404, a median operation for computing a median value of the pixels, a maximum operation for finding the maximum value of pixels, a minimum operation for finding a minimum value of the pixels, a regression operation that maps values of the pixels to a value for the slot 404, and/or other known types of operations. The consolidation operation can also include a threshold operation on a visibility slice. For example, the consolidation operation can clamp a value of a slot in the visibility slice to a "0" when the value of the slot in the visibility slice is less than the predetermined threshold; and the consolidation operation can clamp a value of a slot in the visibility slice to a "1" when the value of the slot in the visibility slice is greater than or equal to the predetermined threshold.

In some embodiments, the slice generation module can control a resolution of the 1D slice by controlling a granularity of the grid 402 overlying the height map 202 (e.g., by adjusting the length 406 and/or the width 408 to capture more, or less, pixels). For example, if the slice generation module would like to generate a 1D slice having a lower resolution, the slice generation module can increase a length 406 of the slot 404 in the grid 402. In some embodiments, the slice generation module can smooth out noise in the height map without sacrificing the resolution of the 1D slice by increasing a width 408 of a slot 404 in the grid 402.

In some cases, the height map can include missing height values, which may induce instability in the PIG module. Therefore, in some embodiments, the slice generation module can provide a visibility slice that indicates the visibility of pixels that underlie the 1D slice. The visibility slice can have the same dimensionality as the 1D slice, and each pixel in the visibility slice can indicate a confidence in the corresponding pixel value in the 1D slice. In some cases, a pixel in the visibility slice can indicate a proportion of missing height values amongst the pixels that underlie the slot 404; in other cases, a pixel in the visibility slice can indicate a number of missing height values amongst the pixels that underlie the slot 404.

Figure 5:
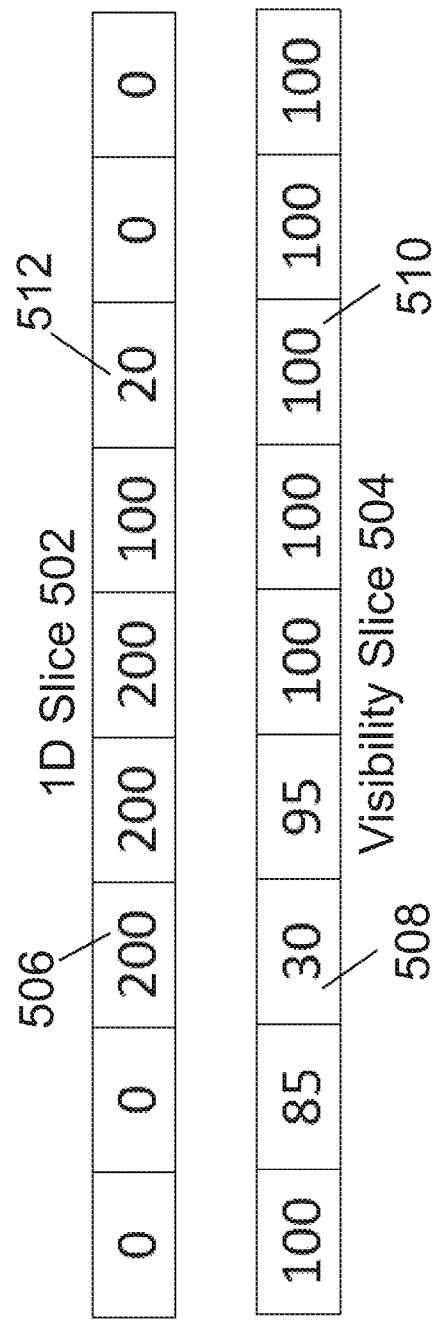
FIG. 5 illustrates a 1D slice and its visibility slice in accordance with some embodiments.

FIG. 5 illustrates a 1D slice and its visibility slice in accordance with some embodiments. The 1D slice 502 indicates a 1D slice created by the system (e.g., based on the grid 402 and the height map 202 of FIG. 4). The visibility slice 504 includes a visibility metric for each slot in the 1D slice 502 that indicates a confidence in the slot based on the values from which the slot was calculated. In some embodiments, the visibility metric is calculated based on a proportion of missing height values amongst the pixels that were used to calculate the slot of the 1D slice. In this exemplary embodiment, a value for a slot in the 1D slice was computed by averaging non-missing height values of height map pixels covered by the slot 404 in the grid 402. For example, the value of the slot 506 in the 1D slice 502 was computed by averaging pixels under the slot 404a of the grid 402 in FIG.

4. The corresponding slot 508 in the visibility slice 504 indicates that 30 percent of the height map pixels in the slot 404*a* were visible (e.g., not missing in the height map, such as due to shadowing, holes, etc. on the object). As another example, a visibility value of 100 percent as shown in slot 510 indicates that all pixels in the corresponding slot 512 of the 1D slice 502 were visible.

Therefore, as shown in the example of FIG. 5, each slot (e.g., each pixel) of the 1D slice 502 has a visibility value associated with it in the visibility slice 504, which is calculated based on the laser sensor data (e.g., whether the pixels in the underlying height map are either visible or non-visible). In some embodiments, the 1D slice can be created from a set of range images, and the visibility metrics can be averaged across the set of range images to calculate the visibility metric for each 1D slice slot. In some embodiments as shown in FIG. 5, the visibility metrics are in the range of [0-100%], where 0% indicates completely non-visible and 100% indicates completely visible. In some embodiments, the visibility metric is normalized to be in the range [0 . . . 1], where 0 is completely non-visible, and 1 is completely visible.

The slice generation module can be used in a variety of applications. For example, the slice generation module can be used to determine posture information of objects captured by a height map, as disclosed below in detail. As another example, the slice generation module can also be used to locate intersections or measure distances between features in three-dimensions. For instance, the slice generation module can be used to look for corners in the height dimension, fit lines to the slice data (allowing computation of angles) or fit curves to the slice data. The visibility slice can be used when performing these functions as described above. The resulting points and lines can then themselves be used to locate intersections or measure distances between features in 3D. As another example, the slice generation module can be used to locate a particular pattern on the height map. For instance, the slice generation module can generate a 1D slice, which can be correlated with (or compared with) a desired pattern to locate the desired pattern in the height map.

Oftentimes, the height map includes not only the range information (e.g., height information) of an object, but also other information such as the range information of a background surrounding the object, such as a conveyor belt. To limit the area in which the features are extracted and measurements are taken, the height map can be associated with a region of interest that indicates an area in which the height map can be processed. The region of interest can include a set of two-dimensional shapes, including, for example, affine rectangles and circular annulus sectors. In some cases, the region of interest can be detected automatically using an edge detection technique. In other cases, the region of interest can be provided by a user using a user interface. For example, a user can draw one or more two-dimensional shapes on a height map to identify the region of interest.

In some embodiments, if the 1D slice has already been generated from a height map, the region of interest can be defined directly on the 1D slice. This way, relevant features of the 1D slice can be extracted just within that region of interest.

In some cases, the height map can be used to determine posture information of the object captured by the height map, such as the location, the orientation, and/or the tilt of the object. In some embodiments, the posture information of an object captured by the height map can be determined using a slice generation module and a PIG module in a computing device, as explained in further detail with reference to FIG. 15. For example, the slice generation module can generate two or more non-parallel 1D slices of a height map. Subsequently, the PIG module can use the two or more non-parallel 1D slices to determine the location (e.g., a translation vector [x, y]) and the height (e.g., a height vector z) of an object. As another example, the PIG module can use 1D slices along a single edge of an object to determine the rotation of the object with respect to the height vector z, the tilt of the object, and/or the like.

Figure 6:
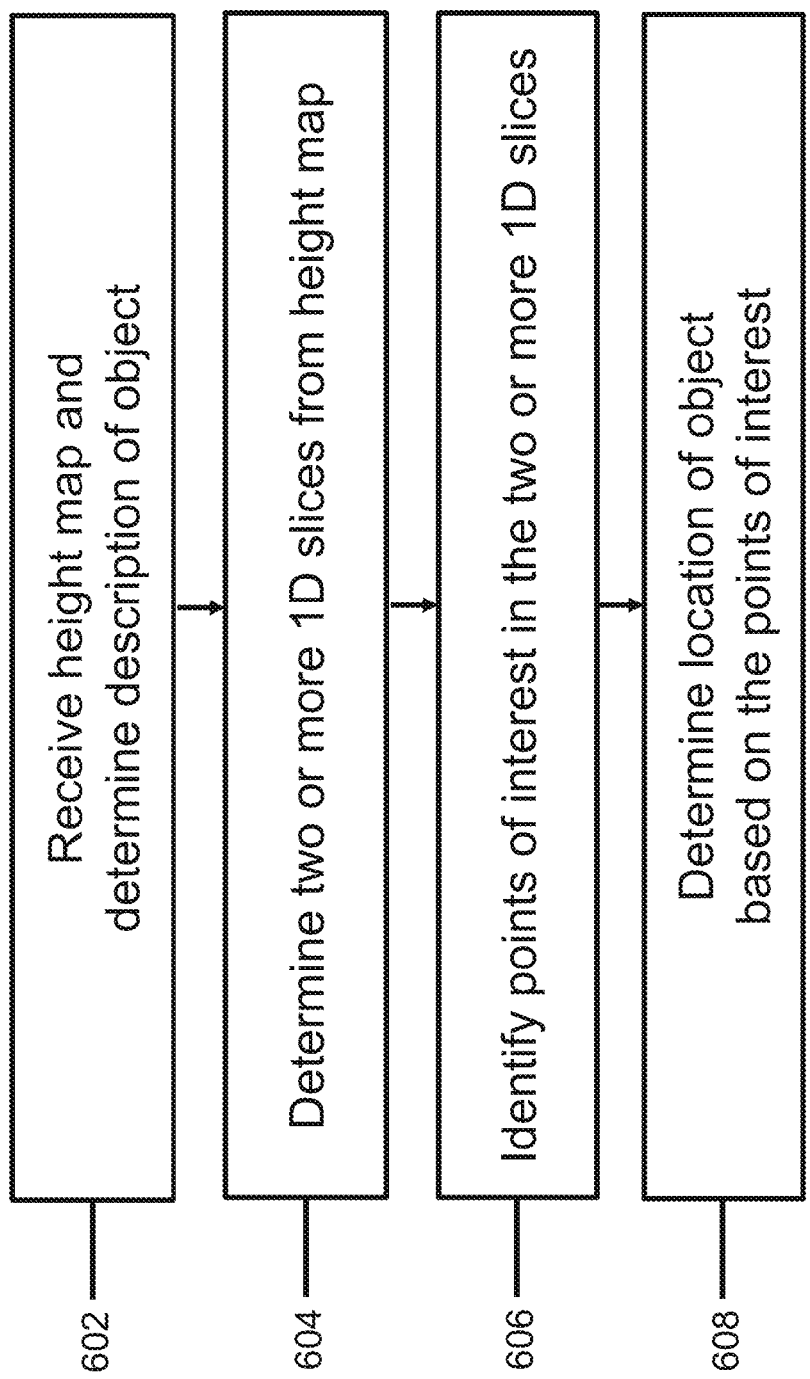
FIG. 6 illustrates a computerized method for determining the location and the height of an object using two or more 1D slices of a height map in accordance with some embodiments.
Figure 7:
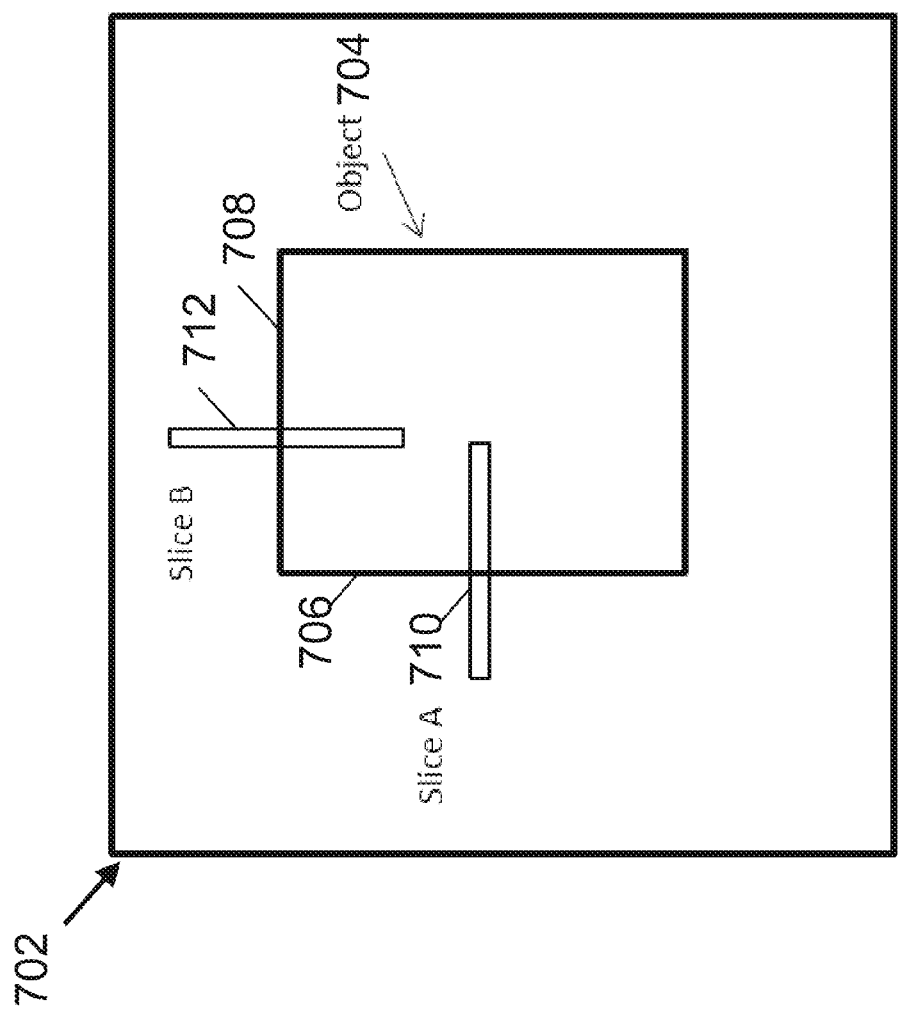
FIG. 7 provides an illustration of the process of FIG. 6 in accordance with some embodiments.

FIG. 6 illustrates a computerized method for determining the location and the height of an object using two or more 1D slices of a height map in accordance with some embodiments, and FIG. 7 provides an illustration of the process of FIG. 6 in accordance with some embodiments. In step 602, the slice generation module receives a height map and retrieves shape information of an object of interest. As illustrated in FIG. 7, the height map 702 can include range information of the object 704. The shape information can include a description of edges in the object. For example, the description of the object can indicate that the object includes at least two rigid, straight, non-parallel edges 706, 708. In some embodiments, the shape information can include relative positions and angles of one or more edges 706 with respect to other edges 708.

In step 604, the slice generation module can generate two or more 1D slices from the height map, as illustrated in FIG. 7 as 710 and 712. In some embodiments, the slice generation module can use the slice generation mechanism described in FIGS. 4-5. In some cases, the slice generation module can generate 1D slices 710, 712 that are not parallel from one another. For example, the slice generation module can generate 1D slices 710, 712 that are perpendicular to one or more potential edges in a height map (e.g., that may correspond to edges 706, 708) in the information of the object identified in step 602. In some embodiments, the slice generation module can maintain a location record that indicates a location of the 1D slices in the height map.

In some embodiments, the slice generation module can estimate a potential location of an object in the height map and generate 1D slices in the estimated neighborhood of the object with the goal that the 1D slices will cross the object edges in the height map at some point. For example, the slice generation module can sample several pixels from the height map and select a pixel having the highest height value as an estimated, central location of an object. As another example, the slice generation module can perform a low-pass filtering on the height map to remove high frequency noise from the height map, and select a pixel having the highest value in the low-pass filtered height map as an estimated, central location of an object.

In step 606, the PIG module can receive the 1D slices from the slice generation module and identify points of interest in the height map based on the received 1D slices. In some embodiments, the points of interest in the height map includes discontinuities in 1D slices. A discontinuity of a 1D slice can correspond to, for example, an edge of an object. The edge of an object can include a sudden change in height values from a background having a constant height value. The edge of an object can also include a gradual change in height values from a background having a constant value (e.g., in the case of a rounded edge or an angled edge).

In some cases, the PIG module can detect the discontinuity in a 1D slice using a discontinuity detector. The discontinuity detector can include a one-dimensional signal processing tool that can detect a change in a one-dimensional signal.

In some cases, the discontinuity detector can be configured to locate the discontinuity by detecting a position, in a 1D slice, at which the value of the 1D slice increases or decreases beyond a certain threshold over a baseline value (e.g., which may be indicative of an edge of an object). The baseline value can be determined based on statistics of values comprising the 1D slice. In some embodiments, the discontinuity detector can include a threshold detector, which is be configured to locate the discontinuity by detecting a position, in a 1D slice, at which the value goes above or below a certain threshold value.

In some embodiments, the discontinuity detector can be adapted to a particular range scanning system or a particular object of interest. For example, if an object is known to have vertical edges, the discontinuity detector can use that prior knowledge to find a vertical discontinuity in the data. As another example, if the object is known to be a frustum (e.g., the frustum shown in FIG. 10), the discontinuity detector can use that prior knowledge to search for the first point in the 1D slice at which the slope begins to increase, instead of a discontinuity in the height data, because a frustum's height is known to increase slowly. Therefore, the discontinuity detector can use the knowledge about the object to search for the discontinuity in the first derivative of the height data instead of the height data directly. In some embodiments, the discontinuity detector can be configured to locate the discontinuity by detecting a position, in a 1D slice, at which a slope of the 1D changes beyond a certain threshold. For example, the discontinuity detector can include a differentiator that is configured to determine a derivative of a 1D slice, a threshold detector that is configured to determine where the derivative of the 1D slices crosses above or below a certain threshold value, and/or the like.

In some embodiments, the points of interest in the height map can include positions at which 1D slices are aligned with a one-dimensional template. For example, the PIG module can maintain a one-dimensional template corresponding to a pattern to be searched. The one-dimensional template can include a step function signal, a ramp function signal, a trapezoid function signal, or any other suitable-shaped signal to be searched. In some cases, the one-dimensional template is shorter than the 1D slices.

In some embodiments, the PIG module can be configured to identify the points of interest in the height map by identifying positions at which 1D slices are aligned with the one-dimensional template. In some cases, the PIG module is configured to identify positions at which 1D slices are aligned with the one-dimensional template by (1) correlating the one-dimensional template with one or more of the 1D slices and (2) identifying one or more positions at which the correlation between the one-dimensional template and the one or more of the 1D slices is the highest or greater than a predetermined threshold. For example, the PIG module can be configured to (1) compute a correlation between the one dimensional template with a 1D slice, (2) shift the one-dimensional template by one pixel, (3) reiterate steps (1) and (2) for all possible shifts, and (4) identify the amount of shift at which the correlation between the one-dimensional template and the one or more of the 1D slices is the highest or greater than a predetermined threshold.

Once the PIG module identifies the points of interest in 1D slices, the PIG module can translate the points of interest in the 1D slices to their positions in the original height map. The PIG module can use locations of the 1D slices in the original height map to translate locations of points of interest in the 1D slices to locations in the height map. For example, if the discontinuity detector identified an edge point of an object, the PIG module can translate the detected edge into a location in the height map to identify where the edge is in the height map. Then the PIG module can determine a height value at the identified discontinuities in the height map, thereby identifying height information of the object. For example, the PIG module can determine a height value at the identified discontinuities by sampling values of the height map at the identified discontinuities.

In step 608, the PIG module can determine a location of the object in the height map, based on the location of the points of interest identified in step 606 and the shape information of the object. For example, the PIG module can transform the shape information, which provides relative positions and angles of one or more edges in the object, to absolute positions of one or more edges in the object.

In some cases, the height map can include missing height values. The missing height values can cause instability in the PIG module. For example, missing height values can result in uncertain or erroneous calculations that do not adequately represent information contained in the height map. If there are missing height values along an otherwise straight line, it would be possible to misinterpret that line as having actual holes. In another example, with a current laser scanning system, missing values can be located at corners. This can render determining the exact location of the corner challenging.

Therefore, in some embodiments, the PIG module can be configured to discard 1D slices that originate from a large amount of missing height values. For example, when the visibility slice indicates a proportion of missing height values amongst pixels that underlie the 1D slice, the PIG module can determine if any of the values in the visibility slice is less than a predetermined threshold, such as a 30%. If so, the PIG module can discard the 1D slice associated with this visibility slice and request the slice generation module to provide a new 1D slice. As another example, when the visibility slice indicates a number of missing height values that underlie the slot in the 1D slice, the PIG module can determine if the number of missing height values in the visibility slice is greater than a predetermined threshold, such as two. If so, the PIG module can discard the 1D slice associated with this visibility slice and request the slice generation module to provide a new 1D slice.

In some embodiments, the PIG module can use the visibility slice in fitting a line to a 1D slice. For example, the PIG module can use the visibility slice to perform a weighted line fitting. A weighted least squares fit, for example, can produce a more accurate fit to lines by giving less importance to height values which have lower confidence (or are totally nonvisible).

Figure 8:
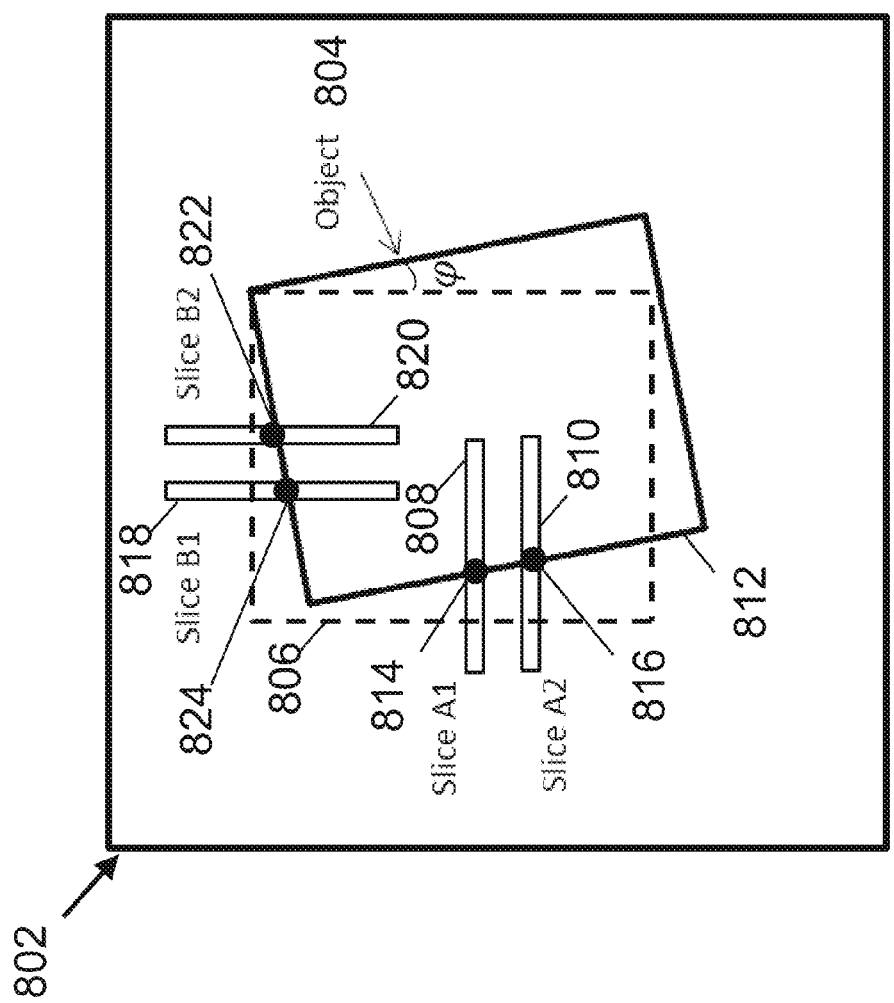
FIG. 8 illustrates a mechanism for determining a rotation of an object in accordance with some embodiments.

In some embodiments, the PIG module can determine a rotation of an object around a height vector (e.g., a direction in which an object's height is measured) when a plurality of 1D slices are available for a single edge of an object. FIG. 8 illustrates a mechanism for determining a rotation of an object in accordance with some embodiments. FIG. 8 shows a height map 802 having range information of an object 804. In this illustration, the object 804 is rotated by an angle of $\phi$ with respect to a base posture 806 indicated by the shape information of the object. The PIG module can use a plurality of 1D slices, for example, 808 and 810, across a single edge of an object, such as 812, to determine the rotation angle $\phi$ with respect to a base posture 806 (or any other base posture of the object 804).

Figure 9:
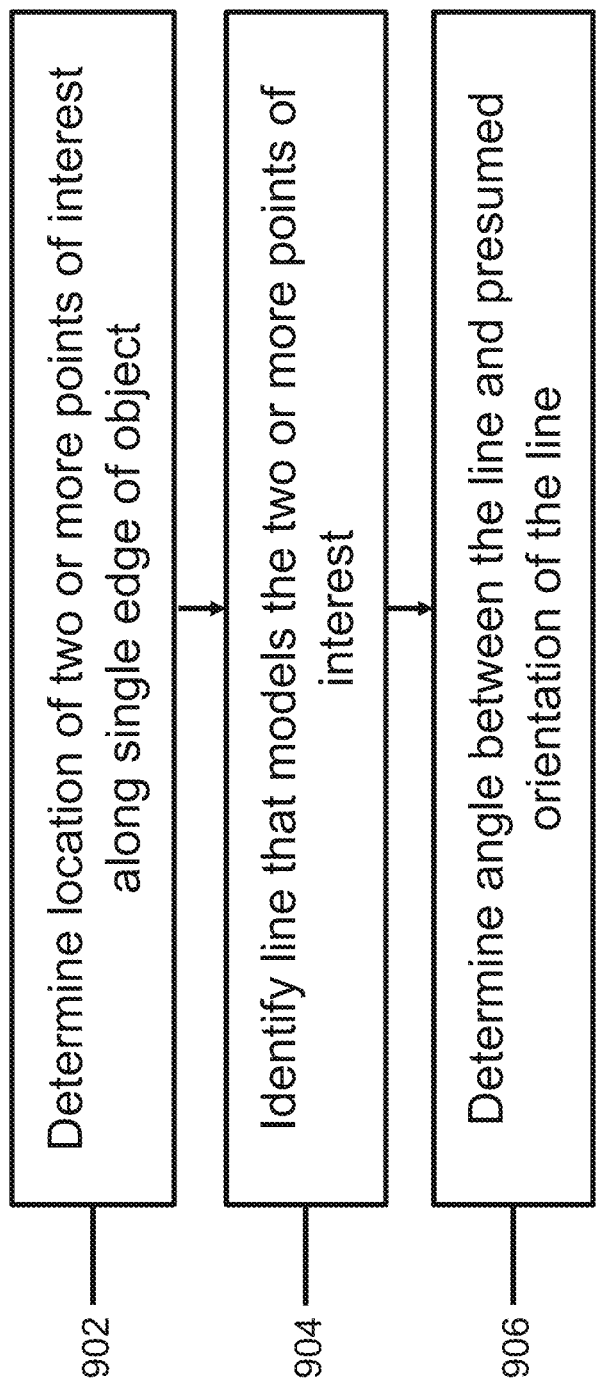
FIG. 9 illustrates a computerized method for determining a rotation of an object around a height vector in accordance with some embodiments.

FIG. 9 illustrates a computerized method for determining a rotation of an object around a height vector in accordance with some embodiments. In step 902, the PIG module can generate 1D slices of a height map (e.g., as described in steps 602-608 of FIG. 6). In this case, the PIG module can generate at least two 1D slices 808, 810 along a single edge of an object and recover locations of at least two points of interest, e.g., discontinuities 814, 816 along a single edge of an object.

In step 904, the PIG module can identify a line that models the two or more points of interest identified in step 902. For example, when the PIG module identifies two points of interest in step 902, the PIG module can identify a line that passes through the two points of interest. As another example, when the PIG module has identified more than two points of interest in step 902, the PIG module can fit a line to those points of interest. For example, the fitting can be performed using a standard line fitting technique. For example, the PIG module can identify a line that minimizes a sum of orthogonal distances between the points of interest and the line.

In step 906, the PIG module can determine an angle between the line and the presumed orientation of the object's edge. Since the PIG module can derive the presumed orientation of the object's edge based on the shape information of the object, the PIG module can determine the angle between the line and the presumed orientation quickly. In some embodiments, the PIG module can compute the angle between the line and the presumed orientation of the line using a dot-product operation of the line's directions.

In some embodiments, the PIG module can improve the accuracy of the estimated rotation angle by repeating the steps 902-906 several times using different edges of the object. For example, the PIG module can repeat the steps 902-906 using 1D slices 818, 820 on another edge of the object 804, thereby identifying a line that models the points of interest, e.g., discontinuities 822, 824 on this edge of the object 804. Then the PIG module can generate another estimate of the rotation angle based on this new line. This way, the PIG module can produce additional estimates of the rotation angle between the base posture 806 and the actual posture of the object 804. The PIG module can process the several estimates of the rotation angle to provide a single reliable estimate of the rotation angle. This way, the PIG module can reduce noise in the rotation angle estimate. In some embodiments, the PIG module can process the several estimates of the rotation angle using one or more of: an averaging operation, a median operation, or a regression operation that maps the several estimates of the rotation angle to a single estimate of the rotation angle.

In some embodiments, the PIG module can estimate a tilt of an object. For example, the PIG module can determine the height values at each of the detected points of interest, and fit a plane to those height values. That fitted plane can represent the height of the top (or the bottom) surface of the object, which provides a tilt information of the object (assuming that the surface of the object has the same height). In some cases, instead of fitting a plane to the height values, the PIG module can match the measured height values to expected height values specified in a golden template model of the object being scanned. The golden template model is a model that can represent height values that are expected to be found. The golden template model, for example, can include a predetermined part model that specifies the height of the object to be found in the height map. In this case, the PIG module can correlate the golden template model to the height map to determine the height difference between the height map and the expected height values according to the golden template model, and use the difference to determine the tilt of the object.

The process illustrated in FIG. 9 can be used to determine the position of the object, the height of the object, and the tilt angle of the top surface. To illustrate the application of the process in FIG. 9, suppose, for simplicity, that the shape of the object is known to have a flat square top, which may be tilted by an unknown angle, and which may also have a small rotation around the Z axis pointing to the top (e.g., a rotation when viewed from the top).

To determine the position of the object, the height of the object, and the tilt angle of the top surface, the PIG module is configured to set up at least two 1D parallel slices (i.e. along the X axis of the original image), which are long enough to ensure that they cross the entire object, separated by a reasonable percentage of the object's size, for example, 20%. Using the discontinuity detector, the PIG module can determine the locations of the start and end of the square top in each 1D slice. By transforming those points back into the object's height map, the PIG module can determine four points in the object's space—two that represent points along the flat top's left edge, and two along the right edge.

The PIG module can determine the angle of rotation of the object by determining the angle of the vector formed between the two points falling on the left edge and the two points formed on the right edge. The PIG module can reduce the numerical inaccuracies due to a scanner error, numerical error, or other sources of error by averaging the two angles reported by the left and right edge points.

The PIG module can determine the height and tilt of the flat top by examining the height values of these four points in the height map and identifying the plane represented by these points using a plain fitting method.

The PIG module can also determine the x-coordinate of the center of the flat top by averaging the x-coordinate position of the left and right edge positions from the first slice, or the x-coordinate position of the left and right edge positions from the second slice. IN some cases, the PIG module can average all four x-coordinate positions to improve the accuracy.

The PIG module can repeat the above process for a second pair of 1D parallel slices along the vertical dimension. This way, the PIG module can determine the y-coordinate position of the center of the flat top. Furthermore, the PIG module can use these 1D parallel slices to determine the height values and the rotation angle of the flat top, and average those results with the results from the first pair of 1D parallel slices to improve the accuracy of the estimates.

Figure 10:
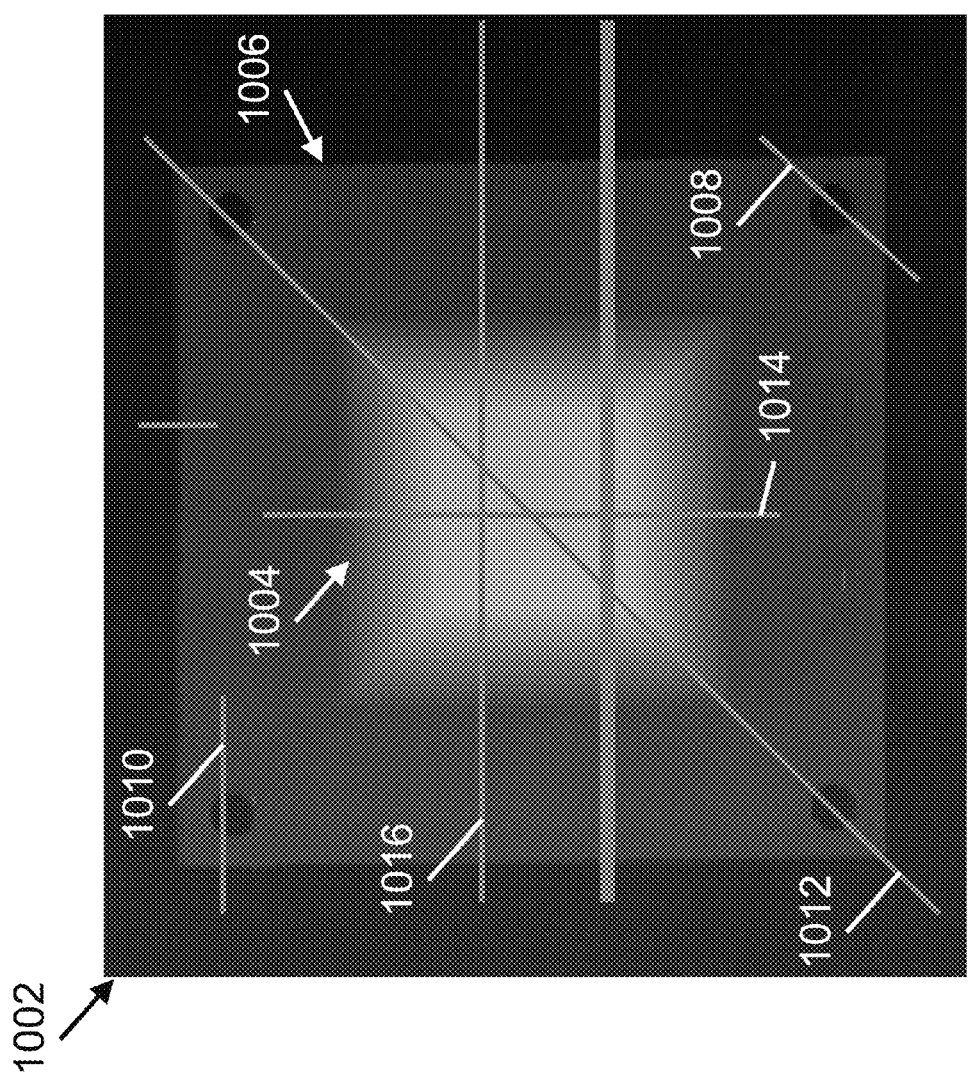
FIG. 10 illustrates a height map of a pyramid structure object and several 1D slices that passes through edges in the object for the purpose of illustration in accordance with some embodiments.

FIG. 10 illustrates a height map of a pyramid structure object and several 1D slices that pass through edges in the object for the purpose of illustration, where the darker pixels are further away from the sensor than the lighter pixels. The height map 1002 includes an image of an object 1004, as well as a plate 1006 on which the object 1004 is placed. In some embodiments, the slice generation module can be configured to generate a slice of the height map in areas that allow an object to be easily identified. For example, the slice generation module can be configured to generate 1D slices across known holes of the plate 1006, such as slices 1008, 1010, and 1012. As another example, the slice generation module can be configured to generate 1D slices through a central portion of the height map.

In some embodiments, the slice generation module can be configured to select areas from which to generate 1D slices by predicting the location of the object 1004 from previously generated 1D slices. For example, suppose that the slice generation module has computed 1D slices at known holes of the plate 1006, such as slices 1008, 1010, and 1012. Based on the 1D slice 1012, the slice generation module can determine that the object may be located at a central portion of the height map. Therefore, the 1D slice generation module can compute a 1D slice through a central portion of the height map to generate, for example, 1D slices 1014, 1016. The PIG module can use 1D slices to estimate a posture of the pyramid structure object in this height map.

In some embodiments, a 1D slice of an object can be used to extract features of the object captured by the height map. The extracted features can be used to take various measurements about the object, such as a size of an object, a shape of an object etc. The extracted features can also be used to aid the posture information generation module in determining the posture information of an object.

The features of the object can be extracted using a feature extraction (FE) module. In some embodiments, the FE module can be configured to identify a furthest point in a given direction identified by a vector (u, v). In particular, given a two-dimensional vector (u, v), the FE module is configured to find a point $(k, z_k)$ on the 1D slice with the highest value of dot product with (u, v). In other words, the FE module is configured to determine a point $(k, z_k)$ on the 1D slice such that for all $(j, z_j)$, $u+vz_k \geq u+vz_j$. In some embodiments, the vector (u, v) can be parameterized by a single value corresponding to an angle. For example, when an angle of the vector with respect to the x-axis is a, then the vector can be represented as $(\cos(\alpha), \sin(\alpha))$.

Figure 11:
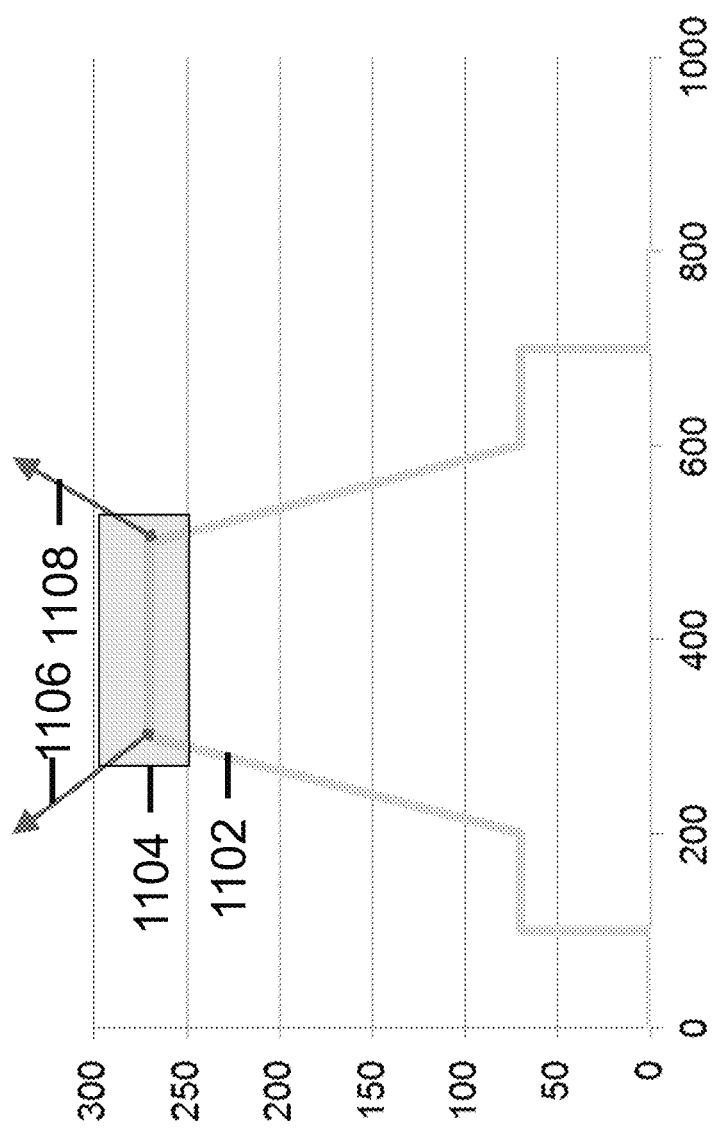
FIG. 11 illustrates an application of identifying a furthest point of a 1D slice in a given direction in accordance with some embodiments.

This feature can be useful for determining a width of an object. FIG. 11 illustrates an application of identifying a furthest point of a 1D slice in a given direction in accordance with some embodiments. As illustrated in FIG. 11, the FE module can be configured to identify a point on a 1D slice 1102 within a region of interest 1104 along a direction identified by an arrow 1106. This allows the FE module to identify a left-most point of the top of the 1D slice 1102. Likewise, the FE module can be configured to identify a point on a 1D slice 1102 within a region of interest 1104 along a direction identified by an arrow 1108. This allows the FE module to identify a right-most point of the top of the 1D slice 1102. The FE module can compute the difference between the left-most point and the right-most point to determine the width of the top portion of the object identified by the 1D slice 1102. In some embodiments, the size of the region of interest 1104 can be controlled to determine the desired granularity of the detected feature (e.g., in the example provided above, the width of the top portion of the object.)

Figure 12:
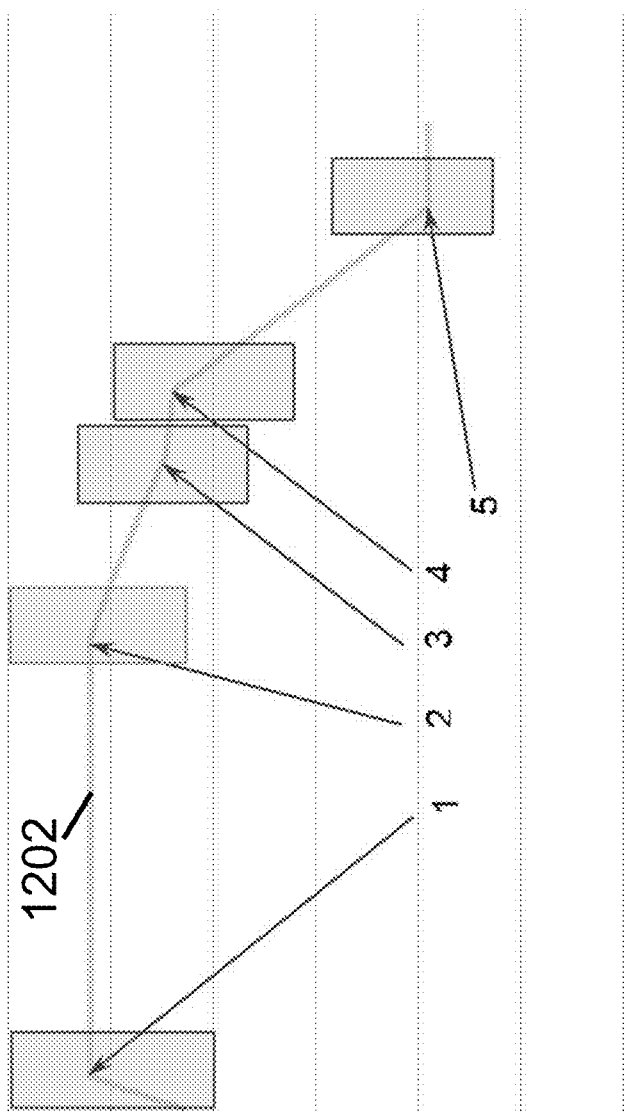
FIG. 12 illustrates the corner detection operation in accordance with some embodiments.

In some embodiments, the FE module can be configured to detect corner points of the 1D slice. FIG. 12 illustrates the corner detection operation in accordance with some embodiments. The 1D slice 1202 can include one or more corners, identified by 1-5. To detect these corners, the 1D slice can be configured to determine the second derivative of the 1D slice and choose the point with the highest local second derivative (e.g., the highest second derivative within a window of interest). In some embodiments, the FE module can take into account the polarity of the second derivative to determine whether the detected corner is a bulging-out corner, such as corners 1, 2, and 4, or a bulging-in corner, such as corners 3 and 5.

Figure 13:
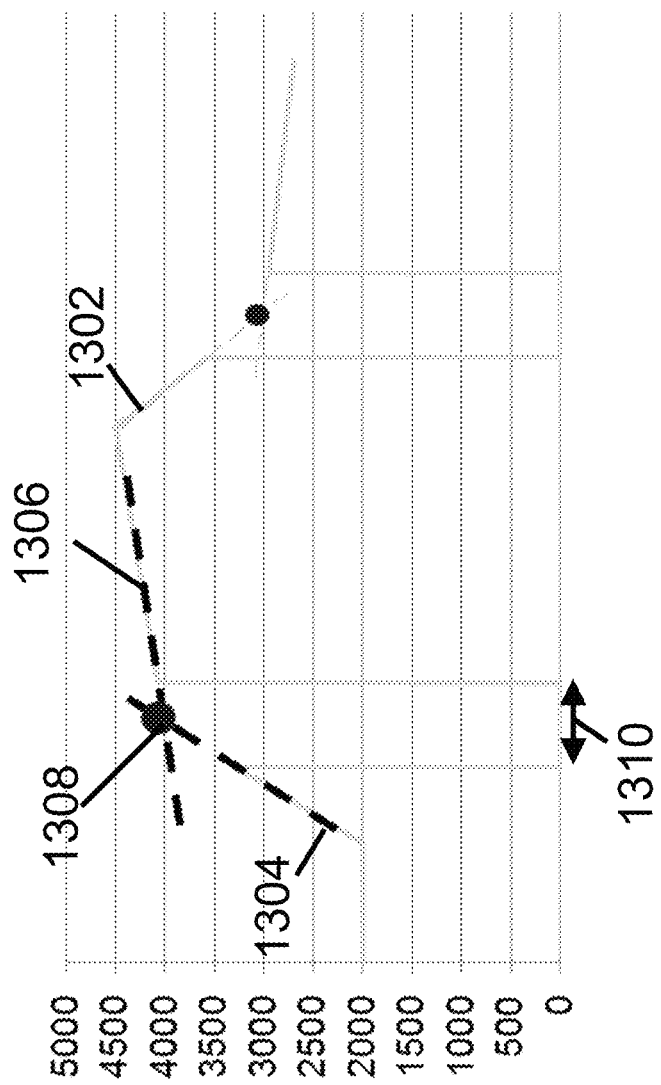
FIG. 13 illustrates a process for computing an intersection point of two line segments in accordance with some embodiments.

In some embodiments, the FE module can be configured to detect an intersection of two lines or line segments. The intersection point may not be on the lines or line segments, but can be on the segment's continuation line. This feature can be useful when the point of interest is in the missing pixels area. FIG. 13 illustrates a process for computing an intersection point of two line segments in accordance with some embodiments. The 1D slice 1302 includes two line segments 1304 and 1306. These line segments can be extrapolated to identify a position in which the two line segments meet. This point 1308 at which the extrapolated line segments 1304, 1306 meet is the intersection point. This feature of the FE module can be particularly useful when certain parts of the 1D slice 1302 are missing. For example, in this case, the intersection point 1308 lies within a region 1310 in which the 1D slice values are missing, as would be indicated by the visibility slice.

In some embodiments, the FE module can be configured to parameterize the line segments in order to determine the intersection points. For example, the FE module can be configured to fit points on the 1D slice to a linear model using, for instance, a regression technique or a RANdom SAmple Consensus (RANSAC) technique.

Figure 14:
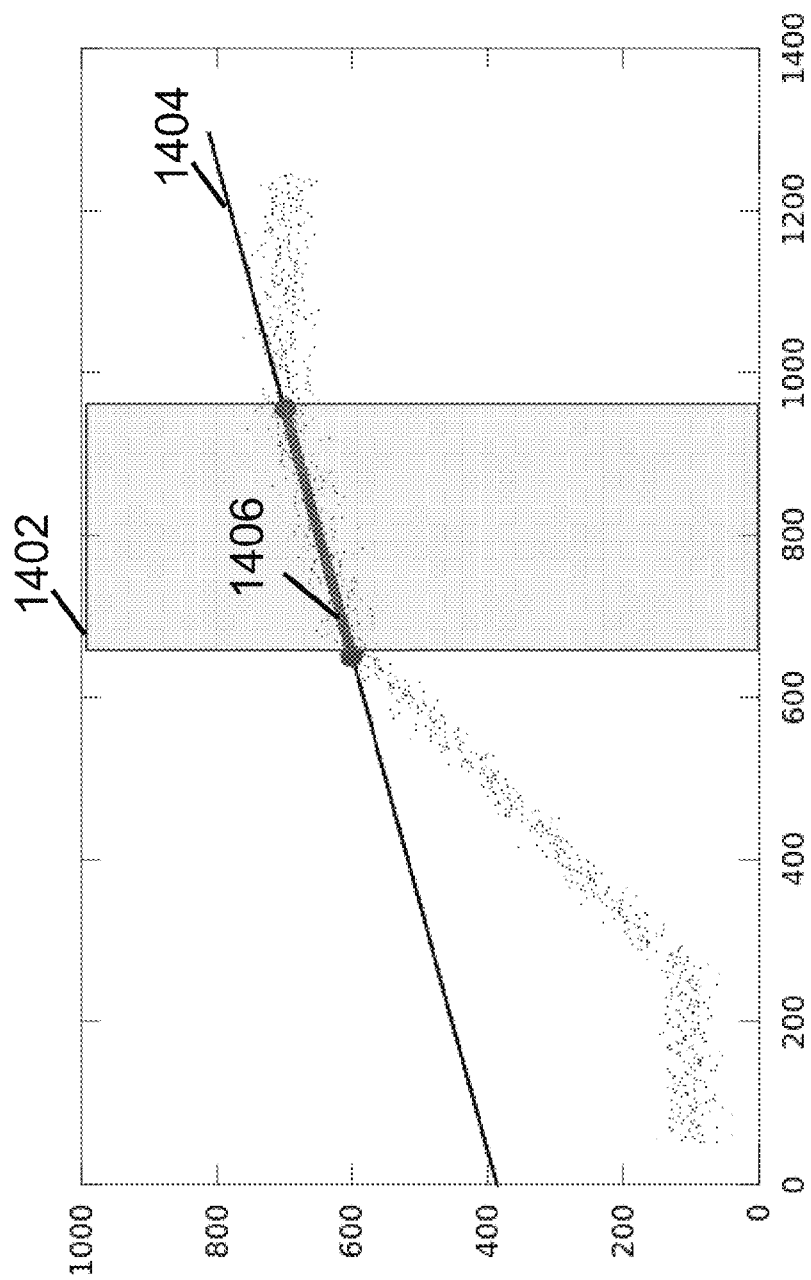
FIG. 14 illustrates a process of finding a line segment having a desired slope in accordance with some embodiments.

In some embodiments, the FE module can be configured to find a line segment, from a set of points, having a desired slope (or having a slope within an error range from the desired slope). FIG. 14 illustrates a process of finding a line segment having a desired slope in accordance with some embodiments. The FE module can be configured to compute the slope of the points inside a sliding window 1402 of a specified size until it finds a slope fitting the angle range specified by the input parameters, such as the slope identified by a line 1404. Once the FE module identifies such a window of points, the FE module can return the largest line segment 1406 fitting the slope requirement 1404. In some cases, the FE module can be configured to compute the slope of the points inside a sliding window 1402 using a regression technique. In other cases, the FE module can be configured to compute the slope of the points inside a sliding window 1402 in two steps. The first step includes discarding (or filtering out) points that clearly do not meet the slope requirement using a finite impulse response (FIR) filter. The second step includes processing the remaining points to compute the slope using the regression technique. The two step process can be computationally efficient because the regression technique can be computationally expensive when there are large number of data points to fit.

In some embodiments, the FE module can be configured to detect edges. The FE module can determine the location of an edge as a zero-crossing of the second derivative (i.e., min/max of the slope). The derivative is computed by convolving [−1, 2, −1] with the 1D slice, and optionally, further smoothing the convolved result with a Gaussian. The length of the Gaussian can be controlled using an input parameter. Only the edges whose slope is large enough (in absolute value) are detected.

In some embodiments, the FE module can be configured to detect predetermined shapes, such as a circle. The FE module can detect a circle by finding a radius R and a center point $(c_x, c_z)$ that minimizes the error D:

$$D = \sum_{k \in S} \overline{w}_k d_k^2$$

$$d_k = z_k - c_z - \sqrt{R^2 - (x_k - c_x)^2}$$

$$\overline{w}_k = \frac{w_k}{\sum_{k \in S} w_k}$$

In some cases, the FE module can minimize the error D in two steps. In the first step, the FE module can find the center point ($c_x$, $c_z$) that minimizes the error D. Then, in the second step, the FE module can find, at the determined center point, the radius R that minimizes the error D.

In some embodiments, the FE module can use the visibility slice to refine the feature extraction and/or processing results. For example, as discussed previously, the FE module can binarize the visibility metrics (e.g., from the [0 . . . 1] range) to a simple true (1) or false (0) metric by using a predetermined threshold. For instance, any visibility metric with a value at or above the threshold is set as visible (1), and anything below the threshold is set to nonvisible (0). Then the FE module can use only the visible (1) pixels in the 1D slice to perform the feature extraction discussed above.

The binarized visibility slice can be useful for a variety of applications of the FE module. Suppose the FE module is configured to fit a line to a region of a cross section (e.g., for edge detection), and the parts being measured are known to be solid. If the parts being measured are solid, the missing pixels may simply be due to errors caused by the image sensor or reflections off the object, and can therefore be ignored when performing the line fit. Therefore, the FE module can set the threshold low (e.g., 30%-50%) to ensure that the largest number of 1D slice pixels can be used to perform the line fitting.

As another example, the FE module may be configured to determine the highest point or pixel in the 1D slice. In this case, the FE module can be configured to binarize the values of the visibility slice and use values of the 1D slice even if the visibility metric for the 1D slice is low. For instance, the threshold can be configured to ignore 1D slice values with a weight below a threshold of 0.2, and therefore anything with a value of 0.2 or greater considered in the computation.

As another example, the FE module can be configured to use the visibility slice to find corners of an object in a height map. Because of the optical nature of the laser source (e.g., its positioning with respect to the object as it is observed by the image sensor), areas of nonvisibility can be observed around corners of an object, such as where the edge of an object touches the base surface. Depending on the orientation of the object being observed, the edges can be occluded such that the resulting height map may include a number of non-visible pixels. Therefore a corner finding function can be designed to take such non-visible pixels into account to avoid such measurements causing inaccurate results. For example, an algorithm can be configured to use visibility information from the visibility slice to estimate the true corner point better. In some embodiments, if the algorithm determines there are a large number of non-visible pixels (e.g., by binarizing the visibility slice), the algorithm can be configured to use more valid data (e.g., visible pixels) from the height map that are further away from the "bad" non-visible area to estimate the location of the corner or edge in the height map while ignoring the mostly nonvisible pixels.

In some embodiments, the FE module can factor the visibility slice into the range sensing results. In particular, the FE module can use both the 1D slice and the visibility slice as inputs to a function that computes a desired value from the 1D slice and the visibility slice. For example, the FE module can use the visibility slice as weights associated with pixels in the 1D slice so that a pixel can contribute a different amount to the extracted feature or the pressing results based on the visibility metric associated with the pixel. As another example, the FE module can be configured to get the average height in a region of the 1D slice. The FE module can use the actual visibility weights to accurately reflect the average height value of the visible pixels in the region, while ignoring the contributions of nonvisible source pixels from the height map.

Figure 15:
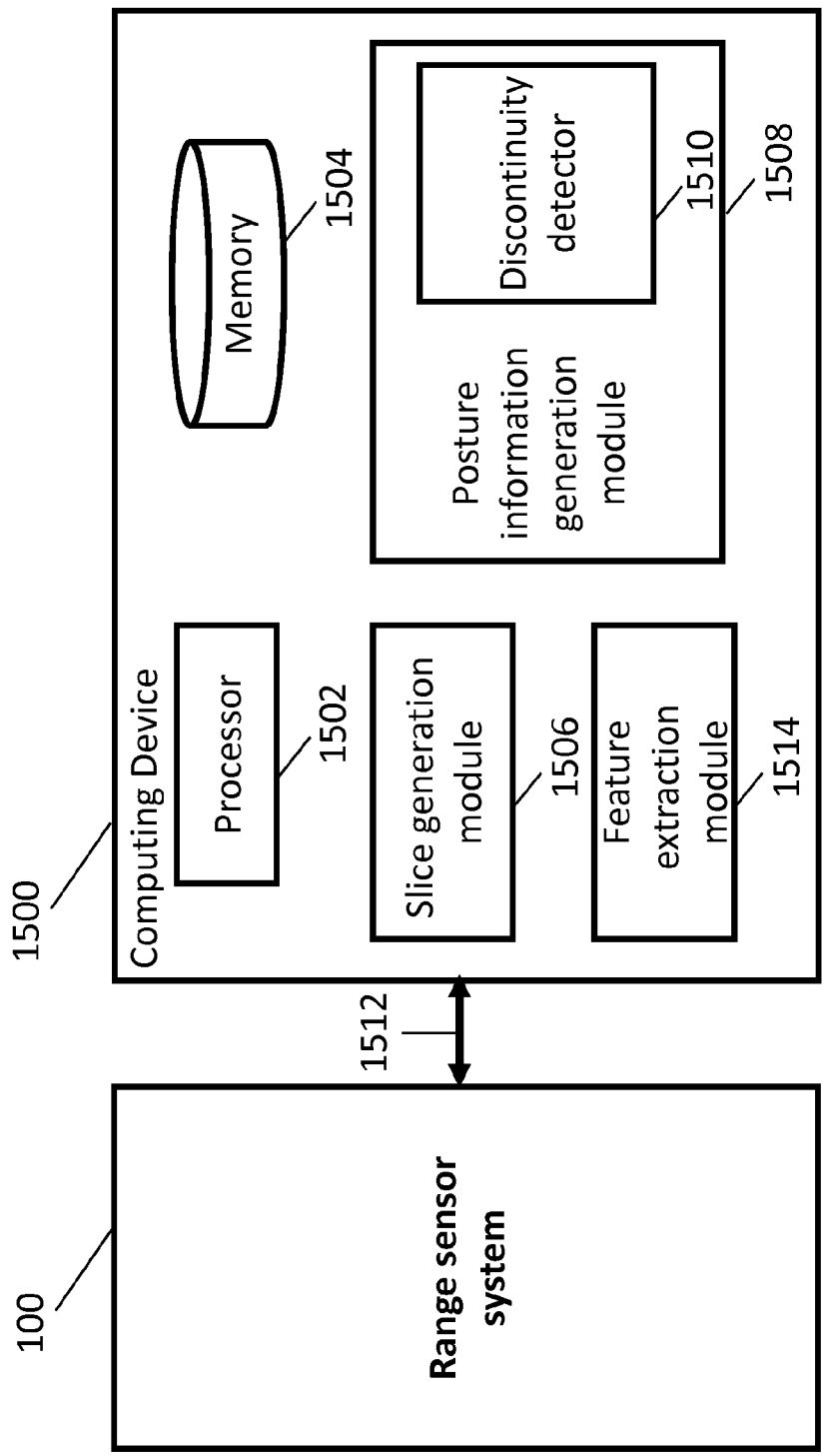
FIG. 15 shows an exemplary range sensor system for capturing a height map of an object and a computing device for processing the height map captured by the range sensor system in accordance with some embodiments.

The disclosed apparatus and systems can include a computing device and a range sensor system. FIG. 15 shows an exemplary range sensor system for capturing a height map of an object and a computing device for processing the height map captured by the range sensor system in accordance with some embodiments. The computing device 1500 can include a processor 1502, memory 1504, a slice generation module 1506, a posture information generation (PIG) module 1508, which can include a discontinuity detector 1510, and a feature extraction (FE) module 1514. As described above, the slice generation module 1506 can be configured to generate one or more 1D slices of a height map; the PIG module 1508 can be configured to determine posture information of an object in the height map by processing the 1D slices generated by the slice generation module using the discontinuity detector 1510; and the FE module 1514 can detect and generate features for the object measured by the height map. In other embodiments, the computing device 1500 may include a different set of modules to perform the operations.

The computing device 1500 can communicate with the range sensor system 100 via the interface 1512. The interface 1512 can be implemented in hardware to send and receive signals in a variety of mediums, such as optical, copper, and wireless, and in a number of different protocols some of which may be non-transient.

In some embodiments, one or more of the modules 1506, 1508, 1514 can be implemented in software using the memory 1504. The memory 1504 can be a non-transitory computer readable medium, flash memory, a magnetic disk drive, an optical drive, a programmable read-only memory (PROM), a read-only memory (ROM), or any other memory or combination of memories. The software can run on a processor 1502 capable of executing computer instructions or computer code. The processor 1502 might also be implemented in hardware using an application specific integrated circuit (ASIC), programmable logic array (PLA), digital signal processor (DSP), field programmable gate array (FPGA), or any other integrated circuit.

Method steps can be performed by one or more processors executing a computer program to perform functions of the invention by operating on input data and/or generating output data. One or more of the modules (e.g., modules 1506, 1508, 1514) can be implemented in hardware using an ASIC (application-specific integrated circuit), PLA (programmable logic array), DSP (digital signal processor), FPGA (field programmable gate array), or other integrated circuit. In some embodiments, two or more modules 1506, 1508 can be implemented on the same integrated circuit, such as ASIC, PLA, DSP, or FPGA, thereby forming a system on chip. Subroutines can refer to portions of the computer program and/or the processor/special circuitry that implement one or more functions.

In some embodiments, the computing device 1500 can include user equipment. The user equipment can communicate with one or more radio access networks and with wired communication networks. The user equipment can be a cellular phone. The user equipment can also be a smart phone providing services such as word processing, web browsing, gaming, e-book capabilities, an operating system, and a full keyboard. The user equipment can also be a tablet computer providing network access and most of the services provided by a smart phone. The user equipment operates using an operating system such as Symbian OS, iPhone OS, RIM's Blackberry, Windows Mobile, Linux, HP WebOS, and Android. The screen might be a touch screen that is used to input data to the mobile device, in which case the screen can be used instead of the full keyboard. The user equipment can also keep global positioning coordinates, profile information, or other location information.

The computing device 1500 can also include a server. The server can operate using an operating system (OS) software. In some embodiments, the OS software is based on a Linux software kernel and runs specific applications in the server such as monitoring tasks and providing protocol stacks. The OS software allows server resources to be allocated separately for control and data paths. For example, certain packet accelerator cards and packet services cards are dedicated to performing routing or security control functions, while other packet accelerator cards/packet services cards are dedicated to processing user session traffic. As network requirements change, hardware resources can be dynamically deployed to meet the requirements in some embodiments.

The above-described techniques can be implemented in digital electronic circuitry, or in computer hardware, firmware, software, or in combinations of them. The implementation can be as a computer program product, e.g., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Processors suitable for the execution of a computer program include, by way of example, both general and special purpose microprocessors, digital signal processors, and any one or more processors of any kind of digital computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. A computer can be operatively coupled to external equipment, for example factory automation or logistics equipment, or to a communications network, for example a factory automation or logistics network, in order to receive instructions and/or data from the equipment or network and/or to transfer instructions and/or data to the equipment or network. Computer-readable storage devices suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

We claim:

1. A computerized method of determining posture information of an object in a height map comprising a plurality of pixels captured by a range sensor system, the method comprising:
   receiving, at a slice generation module in a computing device, the height map of the object captured by the range sensor system;
   providing, by the slice generation module, a plurality of line segments over the height map, wherein each line segment has a plurality of slots;
   determining, by the slice generation module, a plurality of visibility slices, wherein each visibility slice is associated with one of the line segments and comprises a plurality of visibility values, where each visibility value indicates a proportion of missing height values amongst pixels underlying one of the plurality of slots of the associated line segment;
   extracting, by the slice generation module, a plurality of one-dimensional slices from the height map, wherein extracting the plurality of one-dimensional slices comprises determining an appropriate height map value for each of the plurality of slots in the line segment based on a subset of the plurality of pixels contained within each of the plurality of slots with non-missing height values;
   extracting, by the slice generation module, a location record indicating locations of the plurality of one-dimensional slices within the height map;
   identifying, by a posture information generation module in the computing device, a location of at least one point of interest in the height map by analyzing the plurality of extracted one-dimensional slices, the location record, and the plurality of visibility slices; and
   determining, by the posture information generation module, the posture information of the object based on the location of the at least one point of interest in the height map.

2. The method of claim 1, further comprising maintaining shape information of the object, and wherein determining the posture information of the object based on the locations further comprises determining the posture information of the object based on the locations of the at least one point of interest in the height map and the shape information.

3. The method of claim 2, wherein the shape information comprises one or more of: (1) a number of edges in the object, (2) a relative location of the edges with respect to other edges in the object, and (3) an angle between the edges in the object.

4. The method of claim 2, wherein generating the plurality of one-dimensional slices of the height map comprises generating two or more non-parallel one-dimensional slices, wherein each of the non-parallel one-dimensional slices is configured to cross a unique edge of the object.

5. The method of claim 2, wherein generating the plurality of one-dimensional slices of the height map comprises generating two or more one-dimensional slices configured to cross a first edge of the object, and wherein the posture information of the object comprises a rotation angle of the object around an axis aligned with a height of the object.

6. The method of claim 5, wherein determining the posture information of the object comprises fitting a line through the at least one point of interest along the first edge of the object and determining an angle between the line and a presumed orientation of the first edge of the object based on shape information of the object.

7. The method of claim 1, wherein the at least one point of interest comprises at least one discontinuity in one of the plurality of one-dimensional slices, and wherein identifying the location of the at least one point of interest in the height map based on the plurality of one-dimensional slices and the location record comprises:
identifying, by the posture information generation module in the computing device, the at least one discontinuity in the one of the plurality of one-dimensional slices; and
determining, by the posture information generation module, a location of the at least one discontinuity in the height map based on the location record.

8. The method of claim 7, wherein the at least one discontinuity in the plurality of one-dimensional slices comprises locations at which the plurality of one-dimensional slices crosses an edge of the object in the height map.

9. The method of claim 1, wherein identifying the location of the at least one point of interest based on the plurality of one-dimensional slices comprises determining a location at which one of the plurality of one-dimensional slices is aligned with a one-dimensional template.

10. The method of claim 9, wherein determining the location at which one of the plurality of one-dimensional slices is aligned with the one-dimensional template comprises determining a correlation between the one of the plurality of one-dimensional slices and the one-dimensional template.

11. The method of claim 1, wherein generating the plurality of one-dimensional slices of the height map comprises:
providing a grid comprising the plurality of slots over the pixels of the height map;
determining a first set of pixels of the height map that underlies one of the plurality of slots of the grid; and
determining a value for the one of the plurality of slots of the grid by performing a consolidation operation on the first set of pixels, wherein the consolidation operation comprises one or more of: an averaging operation, a weighted average operation of non-missing values in the first set of pixels, a median operation, a maximum operation for finding a maximum value of the first set of pixels, a minimum operation for finding a minimum value of the first set of pixels, a regression operation, or any combination thereof.

12. The method of claim 1, wherein identifying the location of at least one point of interest in the height map comprises discarding one of the plurality of one-dimensional slices when any value in the visibility slice corresponding to the one of the plurality of one-dimensional slices is less than a predetermined threshold.

13. The method of claim 1, wherein analyzing the plurality of extracted one-dimensional slices, the location record, and the plurality of visibility slices comprises using one of the visibility slices as weights associated with one of the extracted one-dimensional slices.

14. The method of claim 13, further comprising computing a weighted average height value of one of the extracted one-dimensional slices using one of the visibility slices as the weights.

15. The method of claim 1, further comprising fitting a line to one of the plurality of one-dimensional slices.

16. The method of claim 15, wherein fitting the line to the one of the plurality of one-dimensional slices comprises fitting the line using the corresponding visibility slice as weights in a weighted least squares fit.

17. A computing device configured to determine posture information of an object in a height map comprising a plurality of pixels captured by a range sensor system, the computing device comprising:
one or more interfaces configured to communicate with the range sensor system;
a processor, in communication with the one or more interfaces, and configured to run a slice generation module stored in memory that is configured to:
receive the height map of the object captured by the range sensor system;
provide a plurality of line segments over the height map, wherein each line segment has a plurality of slots;
determine a plurality of visibility slices, wherein each visibility slice is associated with one of the line segments and comprises a plurality of visibility values, where each visibility value indicates a proportion of missing height values amongst pixels underlying one of the plurality of slots of the associated line segment;
extract a plurality of one-dimensional slices from the height map and a location record indicating locations of the plurality of one-dimensional slices on the height map, wherein extracting the plurality of one-dimensional slices comprises determining an appropriate height map value for each of the plurality of slots in the line segment based on a subset of the plurality of pixels contained within each of the plurality of slots; and
wherein the processor is further configured to run a posture information generation module stored in the memory that is configured to:
identify a location of at least one point of interest in the height map by analyzing the plurality of extracted one-dimensional slices the location record, and the plurality of visibility slices; and
determine the posture information of the object based on the location of the at least one point of interest in the height map.

18. The computing device of claim 17, wherein the posture information generation module is further configured to maintain shape information of the object and determine the posture information of the object based on the location of the at least one point of interest in the height map and the shape information.

19. The computing device of claim 17, wherein the slice generation module is further configured to generate two or more non-parallel one-dimensional slices, wherein each of the non-parallel one-dimensional slices is configured to cross a unique edge of the object.

20. The computing device of claim 17, wherein the slice generation module is further configured to generate two or more one-dimensional slices configured to cross a first edge of the object, and wherein the posture information of the object comprises a rotation angle of the object around an axis aligned with a height of the object.

21. The computing device of claim 17, wherein the slice generation module is further configured to:
provide a grid comprising the plurality of slots over the pixels of the height map;
determine a first set of pixels of the height map that underlies one of the plurality of slots of the grid; and
determine a value for the one of the plurality of slots of the grid by performing a consolidation operation on the first set of pixels, wherein the consolidation operation comprises one or more of: an averaging operation, a weighted average operation of non-missing values in the first set of pixels, a median operation, a maximum operation for finding a maximum value of the first set of pixels, a minimum operation for finding a minimum value of the first set of pixels, a regression operation, or any combination thereof.

22. A non-transitory computer readable medium having executable instructions associated with a slice generation module and a posture information generation module, operable to cause a data processing apparatus to:
receive a height map, comprising a plurality of pixels, of the object captured by a range sensor system in communication with a range sensor system;
provide a plurality of line segments over the height map, wherein each line segment has a plurality of slots;
determine a plurality of visibility slices, wherein each visibility slice is associated with one of the line segments and comprises a plurality of visibility values, where each visibility value indicates a proportion of missing height values amongst pixels underlying one of the plurality of slots of the associated line segment;
extract a plurality of one-dimensional slices from the height map and a location record indicating locations of the plurality of one-dimensional slices on the height map, wherein extracting the plurality of one-dimensional slices comprises determining an appropriate height map value for each of the plurality of slots in the line segment based on a subset of the plurality of pixels contained within each of the plurality of slots;
identify a location of at least one point of interest in the height map by analyzing the plurality of extracted one-dimensional slices the location record, and the plurality of visibility slices; and
determine posture information of the object based on the location of the at least one point of interest in the height map.

23. The non-transitory computer readable medium of claim 22, further comprising executable instructions associated with the posture information generation module, operable to cause the data processing apparatus to maintain shape information of the object and determine the posture information of the object based on the location of the at least one point of interest in the height map and the shape information.

24. The non-transitory computer readable medium of claim 22, further comprising executable instructions operable to cause the data processing apparatus to:
provide a grid comprising the plurality of slots over the pixels of the height map;
determine a first set of pixels of the height map that underlies one of the plurality of slots of the grid; and
determine a value for the one of the plurality of slots of the grid by performing a consolidation operation on the first set of pixels, wherein the consolidation operation comprises one or more of: an averaging operation, a weighted average operation of non-missing values in the first set of pixels, a median operation, a maximum operation for finding a maximum value of the first set of pixels, a minimum operation for finding a minimum value of the first set of pixels, a regression operation, or any combination thereof.

* * * * *